United States Patent
Zhu et al.

(10) Patent No.: US 12,228,928 B1
(45) Date of Patent: Feb. 18, 2025

(54) SYSTEM AND METHOD FOR EVALUATING THE PERCEPTION SYSTEM OF AN AUTONOMOUS VEHICLE

(71) Applicant: WAYMO LLC, Mountain View, CA (US)

(72) Inventors: Jiajun Zhu, Palo Alto, CA (US); Christopher Paul Urmson, Mountain View, CA (US); Dirk Haehnel, Sunnyvale, CA (US); Nathaniel Fairfield, Rockingham, VA (US); Russell Leigh Smith, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/220,628

(22) Filed: Jul. 11, 2023

Related U.S. Application Data

(60) Continuation of application No. 17/387,199, filed on Jul. 28, 2021, now Pat. No. 11,747,809, which is a
(Continued)

(51) Int. Cl.
*G06K 9/00* (2022.01)
*B60R 1/00* (2022.01)
(Continued)

(52) U.S. Cl.
CPC ............. *G05D 1/0088* (2013.01); *B60R 1/00* (2013.01); *B60T 7/22* (2013.01); *B60T 8/00* (2013.01);
(Continued)

(58) Field of Classification Search
None
See application file for complete search history.

(56) References Cited

U.S. PATENT DOCUMENTS

| | | | |
|---|---|---|---|
| 1,924,984 | A | 8/1933 | Fageol |
| 3,186,508 | A | 6/1965 | Lamont |

(Continued)

FOREIGN PATENT DOCUMENTS

| | | |
|---|---|---|
| CN | 101073018 A | 11/2007 |
| CN | 101364111 A | 2/2009 |

(Continued)

OTHER PUBLICATIONS

"Extended European Search Report received for European Patent Application No. 11831362.6, mailed on Mar. 14, 2017", 11 pages.

(Continued)

*Primary Examiner* — Wei Wen Yang
(74) *Attorney, Agent, or Firm* — Botos Churchill IP Law

(57) ABSTRACT

A method and apparatus are provided for optimizing one or more object detection parameters used by an autonomous vehicle to detect objects in images. The autonomous vehicle may capture the images using one or more sensors. The autonomous vehicle may then determine object labels and their corresponding object label parameters for the detected objects. The captured images and the object label parameters may be communicated to an object identification server. The object identification server may request that one or more reviewers identify objects in the captured images. The object identification server may then compare the identification of objects by reviewers with the identification of objects by the autonomous vehicle. Depending on the results of the comparison, the object identification server may recommend or perform the optimization of one or more of the object detection parameters.

20 Claims, 19 Drawing Sheets
(12 of 19 Drawing Sheet(s) Filed in Color)

Related U.S. Application Data continuation of application No. 16/692,643, filed on Nov. 22, 2019, now Pat. No. 11,106,893, which is a continuation of application No. 16/209,429, filed on Feb. 27, 2019, now Pat. No. 10,572,717, which is a continuation of application No. 15/874,130, filed on Jan. 18, 2018, now Pat. No. 10,198,619, which is a division of application No. 15/587,680, filed on May 5, 2017, now Pat. No. 9,911,030, which is a continuation of application No. 14/792,995, filed on Jul. 7, 2015, now Pat. No. 9,679,191, which is a continuation of application No. 13/200,958, filed on Oct. 5, 2011, now Pat. No. 9,122,948.

(60) Provisional application No. 61/391,271, filed on Oct. 8, 2010, provisional application No. 61/390,094, filed on Oct. 5, 2010.

(51) Int. Cl.

| | | |
|---|---|---|
| *B60T 7/22* | (2006.01) | |
| *B60T 8/00* | (2006.01) | |
| *B60T 8/17* | (2006.01) | |
| *B60T 8/88* | (2006.01) | |
| *B60T 17/18* | (2006.01) | |
| *B60T 17/22* | (2006.01) | |
| *B60W 30/08* | (2012.01) | |
| *B60W 40/06* | (2012.01) | |
| *B60W 50/14* | (2020.01) | |
| *G01C 21/36* | (2006.01) | |
| *G01S 17/86* | (2020.01) | |
| *G01S 17/931* | (2020.01) | |
| *G05D 1/00* | (2006.01) | |
| *G06Q 10/02* | (2012.01) | |
| *G06Q 30/02* | (2023.01) | |
| *G06Q 30/0207* | (2023.01) | |
| *G06Q 40/08* | (2012.01) | |
| *G06T 7/20* | (2017.01) | |
| *G06T 7/223* | (2017.01) | |
| *G06T 7/231* | (2017.01) | |
| *G06T 7/521* | (2017.01) | |
| *G06T 7/73* | (2017.01) | |
| *G06V 20/58* | (2022.01) | |
| *G06V 20/64* | (2022.01) | |
| *G07C 9/00* | (2020.01) | |
| *B60W 30/186* | (2012.01) | |
| *B60W 50/029* | (2012.01) | |
| *B62D 6/00* | (2006.01) | |
| *G01S 13/86* | (2006.01) | |
| *G06V 10/20* | (2022.01) | |
| *G06V 20/56* | (2022.01) | |

(52) U.S. Cl.
CPC .............. *B60T 8/17* (2013.01); *B60T 8/885* (2013.01); *B60T 17/18* (2013.01); *B60T 17/221* (2013.01); *B60W 30/08* (2013.01); *B60W 40/06* (2013.01); *B60W 50/14* (2013.01); *G01C 21/3617* (2013.01); *G01S 17/86* (2020.01); *G01S 17/931* (2020.01); *G05D 1/0055* (2013.01); *G05D 1/021* (2013.01); *G05D 1/0212* (2013.01); *G05D 1/0214* (2013.01); *G05D 1/0276* (2013.01); *G06Q 10/02* (2013.01); *G06Q 30/02* (2013.01); *G06Q 30/0207* (2013.01); *G06Q 40/08* (2013.01); *G06T 7/20* (2013.01); *G06T 7/223* (2017.01); *G06T 7/231* (2017.01); *G06T 7/521* (2017.01); *G06T 7/74* (2017.01); *G06V 20/58* (2022.01); *G06V 20/64* (2022.01); *G07C 9/00563* (2013.01); *B60R 2300/30* (2013.01); *B60T 2201/022* (2013.01); *B60T 2210/32* (2013.01); *B60T 2270/406* (2013.01); *B60W 30/186* (2013.01); *B60W 2050/0292* (2013.01); *B60W 2420/403* (2013.01); *B60W 2420/408* (2024.01); *B60W 2552/05* (2020.02); *B60W 2555/60* (2020.02); *B60W 2556/10* (2020.02); *B60W 2556/50* (2020.02); *B62D 6/00* (2013.01); *G01S 13/865* (2013.01); *G01S 13/867* (2013.01); *G05B 2219/2637* (2013.01); *G05D 1/024* (2013.01); *G05D 1/0246* (2013.01); *G05D 1/0257* (2013.01); *G05D 1/0274* (2013.01); *G05D 1/0278* (2013.01); *G06T 2207/10004* (2013.01); *G06T 2207/10028* (2013.01); *G06T 2207/30236* (2013.01); *G06T 2207/30252* (2013.01); *G06T 2207/30261* (2013.01); *G06V 10/255* (2022.01); *G06V 20/56* (2022.01); *G06V 20/588* (2022.01)

(56) References Cited

U.S. PATENT DOCUMENTS

| | | |
|---|---|---|
| 3,324,805 A | 6/1967 | Mulch |
| 3,411,139 A | 11/1968 | Lynch et al. |
| 3,596,728 A | 8/1971 | Neville |
| 4,372,414 A | 2/1983 | Anderson et al. |
| 4,387,783 A | 6/1983 | Carman |
| 4,656,834 A | 4/1987 | Elpern |
| 4,924,795 A | 5/1990 | Ottemann |
| 4,970,653 A | 11/1990 | Kenue |
| 4,982,072 A | 1/1991 | Takigami |
| 5,187,666 A | 2/1993 | Watanabe |
| 5,415,468 A | 5/1995 | Latarnik |
| 5,448,487 A | 9/1995 | Arai |
| 5,470,134 A | 11/1995 | Toepfer et al. |
| 5,521,579 A | 5/1996 | Bernhard |
| 5,684,696 A | 11/1997 | Rao et al. |
| 5,774,069 A | 6/1998 | Tanaka et al. |
| 5,790,403 A | 8/1998 | Nakayama |
| 5,906,645 A | 5/1999 | Kagawa et al. |
| 5,913,376 A | 7/1999 | Takei |
| 5,954,781 A | 9/1999 | Slepian et al. |
| 6,055,042 A | 4/2000 | Sarangapani |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |
| 6,226,570 B1 | 5/2001 | Hahn |
| 6,321,147 B1 | 11/2001 | Takeda et al. |
| 6,332,354 B1 | 12/2001 | Lalor et al. |
| 6,343,247 B2 | 1/2002 | Jitsukata et al. |
| 6,385,539 B1 | 5/2002 | Wilson et al. |
| 6,414,635 B1 | 7/2002 | Stewart et al. |
| 6,438,472 B1 | 8/2002 | Tano et al. |
| 6,438,491 B1 | 8/2002 | Farmer |
| 6,453,056 B2 | 9/2002 | Laumeyer et al. |
| 6,470,874 B1 | 10/2002 | Mertes |
| 6,504,259 B1 | 1/2003 | Kuroda et al. |
| 6,516,262 B2 | 2/2003 | Takenaga et al. |
| 6,560,529 B1 | 5/2003 | Janssen |
| 6,591,172 B2 | 7/2003 | Oda et al. |
| 6,606,557 B2 | 8/2003 | Kotzin |
| 6,643,576 B1 | 11/2003 | O'Connor et al. |
| 6,832,156 B2 | 12/2004 | Farmer |
| 6,836,719 B2 | 12/2004 | Andersson et al. |
| 6,847,869 B2 | 1/2005 | Dewberry et al. |
| 6,862,524 B1 | 3/2005 | Nagda |
| 6,876,908 B2 | 4/2005 | Cramer et al. |
| 6,934,613 B2 | 8/2005 | Yun |
| 6,963,657 B1 | 11/2005 | Nishigaki et al. |
| 7,011,186 B2 | 3/2006 | Frentz et al. |
| 7,031,829 B2 | 4/2006 | Nisiyama |

(56) References Cited

U.S. PATENT DOCUMENTS

| | | |
|---|---|---|
| 7,085,633 B2 | 8/2006 | Nishira et al. |
| 7,102,496 B1 | 9/2006 | Ernst, Jr. et al. |
| 7,177,760 B2 | 2/2007 | Kudo |
| 7,194,347 B2 | 3/2007 | Harumoto et al. |
| 7,207,304 B2 | 4/2007 | Lwatsuki |
| 7,233,861 B2 | 6/2007 | Van Buer et al. |
| 7,327,242 B2 | 2/2008 | Holloway et al. |
| 7,340,332 B2 | 3/2008 | Underdahl et al. |
| 7,346,439 B2 | 3/2008 | Bodin |
| 7,366,325 B2 | 4/2008 | Fujimura et al. |
| 7,373,237 B2 | 5/2008 | Wagner et al. |
| 7,394,046 B2 | 7/2008 | Olsson et al. |
| 7,486,802 B2 | 2/2009 | Hougen |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,565,241 B2 | 7/2009 | Tauchi |
| 7,579,942 B2 | 8/2009 | Kalik |
| 7,656,280 B2 | 2/2010 | Hines et al. |
| 7,694,555 B2 | 4/2010 | Howell et al. |
| 7,778,759 B2 | 8/2010 | Tange et al. |
| 7,818,124 B2 | 10/2010 | Herbst et al. |
| 7,835,859 B2 | 11/2010 | Bill |
| 7,865,277 B1 | 1/2011 | Larson et al. |
| 7,894,951 B2 | 2/2011 | Norris et al. |
| 7,908,040 B2 | 3/2011 | Howard et al. |
| 7,956,730 B2 | 6/2011 | White et al. |
| 7,979,175 B2 | 7/2011 | Allard et al. |
| 8,024,102 B2 | 9/2011 | Swoboda et al. |
| 8,050,863 B2 | 11/2011 | Trepagnier et al. |
| 8,078,349 B1 | 12/2011 | Prada Gomez et al. |
| 8,095,313 B1 | 1/2012 | Blackburn |
| 8,099,213 B2 | 1/2012 | Zhang et al. |
| 8,126,642 B2 | 2/2012 | Trepagnier et al. |
| 8,190,322 B2 | 5/2012 | Lin et al. |
| 8,194,927 B2 | 6/2012 | Zhang et al. |
| 8,195,341 B2 | 6/2012 | Huang et al. |
| 8,244,408 B2 | 8/2012 | Lee et al. |
| 8,244,458 B1 | 8/2012 | Blackburn |
| 8,260,515 B2 | 9/2012 | Huang et al. |
| 8,280,601 B2 | 10/2012 | Huang et al. |
| 8,280,623 B2 | 10/2012 | Trepagnier et al. |
| 8,311,274 B2 | 11/2012 | Bergmann et al. |
| 8,352,111 B2 | 1/2013 | Mudalige |
| 8,352,112 B2 | 1/2013 | Mudalige |
| 8,412,449 B2 | 4/2013 | Trepagnier et al. |
| 8,452,506 B2 | 5/2013 | Groult |
| 8,457,827 B1 | 6/2013 | Ferguson et al. |
| 8,634,980 B1 | 1/2014 | Urmson et al. |
| 8,694,236 B2 | 4/2014 | Takagi |
| 8,706,394 B2 | 4/2014 | Trepagnier et al. |
| 8,718,861 B1 | 5/2014 | Montemerlo et al. |
| 8,724,093 B2 | 5/2014 | Sakai et al. |
| 8,775,063 B2 | 7/2014 | Zeng |
| 8,831,813 B1 | 9/2014 | Ferguson et al. |
| 8,855,860 B2 | 10/2014 | Isaji et al. |
| 8,874,267 B1 | 10/2014 | Dolgov et al. |
| 8,918,277 B2 | 12/2014 | Niem et al. |
| 8,929,604 B2 | 1/2015 | Platonov et al. |
| 8,948,954 B1 | 2/2015 | Ferguson et al. |
| 8,949,016 B1 | 2/2015 | Ferguson et al. |
| 8,970,397 B2 | 3/2015 | Nitanda et al. |
| 8,972,093 B2 | 3/2015 | Joshi |
| 9,008,369 B2 | 4/2015 | Schofield et al. |
| 9,062,979 B1 | 6/2015 | Ferguson et al. |
| 9,063,548 B1 | 6/2015 | Ferguson et al. |
| 9,081,383 B1 | 7/2015 | Montemerlo et al. |
| 9,182,759 B2 | 11/2015 | Wimmer et al. |
| 2001/0024095 A1 | 9/2001 | Fitzgibbon et al. |
| 2001/0037927 A1 | 11/2001 | Nagler et al. |
| 2002/0188499 A1 | 12/2002 | Jenkins et al. |
| 2003/0014302 A1 | 1/2003 | Jablin |
| 2003/0016804 A1 | 1/2003 | Sheha et al. |
| 2003/0037977 A1 | 2/2003 | Tatara et al. |
| 2003/0055554 A1 | 3/2003 | Shioda et al. |
| 2003/0093209 A1 | 5/2003 | Andersson et al. |
| 2003/0125963 A1 | 7/2003 | Haken |
| 2004/0243292 A1 | 12/2004 | Roy |
| 2005/0012589 A1 | 1/2005 | Kokubu et al. |
| 2005/0099146 A1 | 5/2005 | Nishikawa et al. |
| 2005/0125154 A1 | 6/2005 | Kawasaki |
| 2005/0131645 A1 | 6/2005 | Panopoulos |
| 2005/0149251 A1 | 7/2005 | Donath et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0089765 A1 | 4/2006 | Pack et al. |
| 2006/0089800 A1 | 4/2006 | Svendsen et al. |
| 2006/0116801 A1 | 6/2006 | Shirley et al. |
| 2006/0173841 A1 | 8/2006 | Bill |
| 2006/0178240 A1 | 8/2006 | Hansel |
| 2006/0276942 A1 | 12/2006 | Anderson et al. |
| 2007/0010942 A1 | 1/2007 | Bill |
| 2007/0024501 A1 | 2/2007 | Yeh |
| 2007/0112477 A1 | 5/2007 | Van et al. |
| 2007/0142992 A1 | 6/2007 | Gronau et al. |
| 2007/0149214 A1 | 6/2007 | Walsh et al. |
| 2007/0165910 A1 | 7/2007 | Nagaoka et al. |
| 2007/0193798 A1 | 8/2007 | Allard et al. |
| 2007/0203617 A1 | 8/2007 | Haug |
| 2007/0225909 A1 | 9/2007 | Sakano |
| 2007/0239331 A1 | 10/2007 | Kaplan |
| 2007/0247281 A1 | 10/2007 | Shimomura |
| 2007/0279250 A1 | 12/2007 | Kume et al. |
| 2008/0021628 A1 | 1/2008 | Tryon |
| 2008/0033615 A1 | 2/2008 | Khajepour et al. |
| 2008/0039991 A1 | 2/2008 | May et al. |
| 2008/0040039 A1 | 2/2008 | Takagi |
| 2008/0056535 A1 | 3/2008 | Bergmann et al. |
| 2008/0059015 A1 | 3/2008 | Whittaker et al. |
| 2008/0059048 A1 | 3/2008 | Kessler et al. |
| 2008/0084283 A1 | 4/2008 | Kalik |
| 2008/0089556 A1 | 4/2008 | Salgian et al. |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0010494 A1 | 1/2009 | Bechtel et al. |
| 2009/0074249 A1 | 3/2009 | Moed et al. |
| 2009/0082879 A1 | 3/2009 | Dooley et al. |
| 2009/0115594 A1 | 5/2009 | Han |
| 2009/0164071 A1 | 6/2009 | Takeda |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0313077 A1 | 12/2009 | Wheeler, IV |
| 2009/0313095 A1 | 12/2009 | Hurpin |
| 2009/0319096 A1 | 12/2009 | Offer et al. |
| 2009/0319112 A1 | 12/2009 | Fregene et al. |
| 2009/0322872 A1 | 12/2009 | Muehlmann et al. |
| 2009/0326799 A1 | 12/2009 | Crook |
| 2010/0010699 A1 | 1/2010 | Taguchi et al. |
| 2010/0014714 A1 | 1/2010 | Zhang et al. |
| 2010/0017056 A1 | 1/2010 | Asakura et al. |
| 2010/0042282 A1 | 2/2010 | Taguchi et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0097457 A1 | 4/2010 | Zhang |
| 2010/0179715 A1 | 7/2010 | Puddy |

(56) References Cited

U.S. PATENT DOCUMENTS

| | | |
|---|---|---|
| 2010/0179720 A1 | 7/2010 | Lin et al. |
| 2010/0191433 A1 | 7/2010 | Groult |
| 2010/0198491 A1 | 8/2010 | Mays |
| 2010/0205132 A1 | 8/2010 | Taguchi et al. |
| 2010/0207787 A1 | 8/2010 | Catten et al. |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2010/0265354 A1 | 10/2010 | Kameyama |
| 2011/0010131 A1 | 1/2011 | Miyajima et al. |
| 2011/0040481 A1 | 2/2011 | Trombley et al. |
| 2011/0071718 A1 | 3/2011 | Norris et al. |
| 2011/0099040 A1 | 4/2011 | Felt et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0210866 A1 | 9/2011 | David et al. |
| 2011/0213511 A1 | 9/2011 | Visconti et al. |
| 2011/0239146 A1 | 9/2011 | Dutta et al. |
| 2011/0246156 A1 | 10/2011 | Zecha et al. |
| 2011/0254655 A1 | 10/2011 | Maalouf et al. |
| 2011/0264317 A1 | 10/2011 | Druenert et al. |
| 2012/0053775 A1 | 3/2012 | Nettleton et al. |
| 2012/0069185 A1 | 3/2012 | Stein |
| 2012/0083960 A1 | 4/2012 | Zhu et al. |
| 2012/0114178 A1 | 5/2012 | Platonov et al. |
| 2012/0157052 A1 | 6/2012 | Quade |
| 2012/0271483 A1 | 10/2012 | Samukawa et al. |
| 2012/0277947 A1 | 11/2012 | Boehringer et al. |
| 2012/0283912 A1 | 11/2012 | Lee et al. |
| 2012/0314070 A1 | 12/2012 | Zhang et al. |
| 2013/0035821 A1 | 2/2013 | Bonne et al. |
| 2013/0054049 A1 | 2/2013 | Uno |
| 2013/0054106 A1 | 2/2013 | Schmudderich et al. |
| 2013/0054128 A1 | 2/2013 | Moshchuk et al. |
| 2013/0144520 A1 | 6/2013 | Ricci |
| 2013/0179382 A1 | 7/2013 | Fritsch et al. |
| 2013/0282277 A1 | 10/2013 | Rubin et al. |
| 2013/0321400 A1 | 12/2013 | Van Os et al. |
| 2013/0321422 A1 | 12/2013 | Pahwa et al. |
| 2014/0067187 A1 | 3/2014 | Ferguson et al. |
| 2014/0088855 A1 | 3/2014 | Ferguson |
| 2014/0156164 A1 | 6/2014 | Schuberth et al. |
| 2014/0195138 A1 | 7/2014 | Stelzig et al. |
| 2014/0214255 A1 | 7/2014 | Dolgov et al. |
| 2014/0350836 A1 | 11/2014 | Stettner et al. |
| 2014/0369168 A1 | 12/2014 | Max et al. |
| 2015/0112571 A1 | 4/2015 | Schmudderich |
| 2015/0153735 A1 | 6/2015 | Clarke et al. |
| 2015/0177007 A1 | 6/2015 | Su et al. |
| 2015/0198951 A1 | 7/2015 | Thor et al. |
| 2015/0203107 A1 | 7/2015 | Lippman |
| 2015/0293216 A1 | 10/2015 | O'Dea et al. |
| 2015/0302751 A1 | 10/2015 | Strauss et al. |
| 2016/0327947 A1 | 11/2016 | Ishikawa et al. |
| 2016/0334230 A1 | 11/2016 | Ross et al. |
| 2016/0334797 A1 | 11/2016 | Ross et al. |

FOREIGN PATENT DOCUMENTS

| | | |
|---|---|---|
| CN | 101522493 A | 9/2009 |
| DE | 10218010 A1 | 11/2003 |
| DE | 10336986 A1 | 3/2005 |
| DE | 102009010006 A1 | 10/2009 |
| DE | 102008023380 A1 | 11/2009 |
| EP | 0884666 A1 | 12/1998 |
| EP | 2042405 A | 4/2009 |
| EP | 2216225 A1 | 8/2010 |
| FR | 2692064 A1 | 12/1993 |
| JP | H05246635 | 9/1993 |
| JP | H08110998 | 4/1996 |
| JP | H0966853 A | 3/1997 |
| JP | 09160643 A | 6/1997 |
| JP | H09161196 A | 6/1997 |
| JP | H09166209 | 6/1997 |
| JP | H1139598 A | 2/1999 |
| JP | 11282530 A | 10/1999 |
| JP | 2000149188 A | 5/2000 |
| JP | 2000193471 A | 7/2000 |
| JP | 2000305625 A | 11/2000 |
| JP | 2000338008 A | 12/2000 |
| JP | 2001101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2003205804 A | 7/2003 |
| JP | 2004206510 A | 7/2004 |
| JP | 2004326730 A | 11/2004 |
| JP | 2004345862 | 12/2004 |
| JP | 2005062912 | 3/2005 |
| JP | 2005067483 A | 3/2005 |
| JP | 2005071114 A | 3/2005 |
| JP | 2005297621 A | 10/2005 |
| JP | 2005339181 A | 12/2005 |
| JP | 2006264530 A | 10/2006 |
| JP | 2006322752 A | 11/2006 |
| JP | 2007001475 A | 1/2007 |
| JP | 2007022135 A | 2/2007 |
| JP | 2007331458 A | 12/2007 |
| JP | 2008087545 A | 4/2008 |
| JP | 2008117082 A | 5/2008 |
| JP | 2008152655 A | 7/2008 |
| JP | 2008170404 A | 7/2008 |
| JP | 2008213581 A | 9/2008 |
| JP | 2008257652 A | 10/2008 |
| JP | 2008290680 A | 12/2008 |
| JP | 2009026321 A | 2/2009 |
| JP | 2009053925 A | 3/2009 |
| JP | 2009075638 A | 4/2009 |
| JP | 2010128637 A | 6/2010 |
| JP | 2010173530 A | 8/2010 |
| JP | 2010182207 A | 8/2010 |
| JP | 2010191803 A | 9/2010 |
| WO | 0070941 A1 | 11/2000 |
| WO | 2001088827 A1 | 11/2001 |
| WO | 2005013235 A1 | 2/2005 |
| WO | 2007145564 A1 | 12/2007 |
| WO | 2009028558 A1 | 3/2009 |
| WO | 2009155228 A1 | 12/2009 |
| WO | 2011021046 A1 | 2/2011 |

OTHER PUBLICATIONS

"Extended European Search Report received for European Patent Application No. 11831503.5, mailed on Dec. 3, 2015", 14 pages.

"Extended European Search Report received for European Patent Application No. 11831505.0, mailed on Apr. 7, 2017", 13 pages.

"Extended European Search Report received for European Patent Application No. 17151573.7, mailed on Apr. 19, 2017", 7 pages.

"Fact Sheet: Beyond Traffic Signals: A Paradigm Shift Intersection Control For Autonomous Vehicles", Available online at: <http://www.fhwa.dot.gov/advancedresearch/pubs/10023/index.cfm>, Accessed on Apr. 27, 2011, 3 pages.

"International Search Report and Written Opinion received for PCT Patent Application No. PCT/US2011/054154, mailed on Apr. 24, 2012", 9 pages.

"International Search Report and Written Opinion received for PCT Patent Application No. PCT/US2011/054896, mailed on Apr. 25, 2012", 8 pages.

"International Search Report and Written Opinion received for PCT Patent Application No. PCT/US2011/054899, mailed on May 4, 2012", 8 pages.

"International Search Report and Written Opinion received for PCT Patent Application No. PCT/US2013/061604, mailed on Jul. 3, 2014", 10 pages.

"Notice of Preliminary Rejection received for Korean Patent Application No. 10-2013-7011655, mailed on May 18, 2017", 14 pages (6 pages of English Translation and 8 pages of Official copy).

(56) References Cited

OTHER PUBLICATIONS

"Notice of Preliminary Rejection received for Korean Patent Application No. 10-2013-7011657, mailed on Feb. 1, 2016", 10 pages (4 pages of English Translation and 6 pages of Official Copy).
"Notice of Reasons for Rejection received for Japanese Patent Application No. 2013-532909, mailed on May 26, 2016", 6 pages (3 pages of English Translation and 3 pages of Official Copy).
"Notice of reasons for rejection received for Japanese Patent Application No. 2013-532909, mailed on Nov. 25, 2015", 9 pages (5 pages of English Translation and 4 pages of Official Copy).
"Office Action received for Chinese Patent Application No. 201180057942.8, mailed on Jun. 3, 2015", 21 pages (14 pages of English Translation and 7 pages of Official Copy).
"Office Action received for Chinese Patent Application No. 201180057954.0, mailed on Apr. 29, 2015", 14 pages (8 pages of English Translation and 6 pages of Official Copy).
"Office Action received for Japanese Patent Application No. 2013-532908, mailed on Sep. 8, 2015", 12 pages (6 pages of English Translation and 6 pages of Official Copy).
"Partial Supplementary European Search Report received for European Patent Application No. 11831505.0, mailed on Dec. 20, 2016", 6 pages.
"TomTom GO user manual", Available online at: <http://download.tomtom.com/open/manuals/device/refman/TomTom-GO-en-GB.pdf>, Accessed on Oct. 1, 2007, 100 pages.
Crane, et al., "Team Gator Nation's Autonomous Vehicle Development For The 2007 DARPA Urban Challenge", Journal of Aerospace Computing, Information and Communication, vol. 4, Dec. 2007, pp. 1059-1085.
Di Leece, et al., "Experimental System To Support Real-Time Driving Pattern Recognition", Advanced Intelligent Computing Theories and Applications, With Aspects of Artificial Intelligence, ICIC 2008, Lecture Notes in Computer Science, vol. 5227, Springer, Berlin, 2008, pp. 1192-1199.
Guizzo, "How's Google's Self-Driving Car Works", Available online at: <http://spectrum.ieee.org/automaton/robotics/artificial-intelligence/how-google-self-driving-car-works>, IEEE, Oct. 18, 2011, pp. 1-31.
Jaffe, Eric, "The First Look at How Google's Self-Driving Car Handles City Streets", The Atlantic City Lab, Apr. 28, 2014, 16 pages.
Markoff, John, "Google Cars Drive Themselves, in Traffic", Available online at: <http://www.nytimes.com/2010/10/10/science/10google.html>, Oct. 9, 2010, 4 pages.
McNaughton, et al., "Motion Planning for Autonomous Driving with a Conformal Spatiotemporal Lattice", IEEE, International Conference on Robotics and Automation, May 9-13, 2011, pp. 4889-4895.
Schonhof, et al., "Autonomous Detection And Anticipation of Jam Fronts From Messages Propagated By Intervehicle Communication", Journal of the Transportation Research Board, vol. 1999, No. 1, Jan. 1, 2007, pp. 3-12.
Tiwari, et al., "Survival Analysis: Pedestrian Risk Exposure at Signalized Intersections", Trans Research Part F: Traffic Psych and Behav, Pergamon, Amsterdam, vol. 10, No. 2, 2007, pp. 77-89.

SYSTEM AND METHOD FOR EVALUATING THE PERCEPTION SYSTEM OF AN AUTONOMOUS VEHICLE

CROSS-REFERENCE TO RELATED APPLICATIONS

The present application is a continuation of U.S. patent application Ser. No. 17/387,199, filed Jul. 28, 2021, which is a continuation of U.S. patent application Ser. No. 16/692,643, filed Nov. 22, 2019, now issued as U.S. Pat. No. 11,106,893, which is a continuation of U.S. patent application Ser. No. 16/209,429, filed Feb. 27, 2019, now issued as U.S. Pat. No. 10,572,717, which is a continuation of U.S. patent application Ser. No. 15/874,130, filed Jan. 18, 2018, now issued as U.S. Pat. No. 10,198,619, which is a divisional of U.S. patent application Ser. No. 15/587,680, filed on May 5, 2017, now issued as U.S. Pat. No. 9,911,030, which is a continuation of U.S. patent application Ser. No. 14/792,995, filed Jul. 7, 2015, now issued as U.S. Pat. No. 9,679,191, which is a continuation of U.S. patent application Ser. No. 13/200,958, filed Oct. 5, 2011, now issued as U.S. Pat. No. 9,122,948, which claims the benefit of the filing date of U.S. Provisional Application No. 61/390,094 filed Oct. 5, 2010, and U.S. Provisional Application No. 61/391,271 filed Oct. 8, 2010, the disclosures of which are hereby incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices that scan and record data from the vehicle's surroundings. These devices in combination (and in some cases alone) may be used determine the location of the object in three-dimensional space.

In determining whether there is an object near the autonomous vehicle, the computing systems may perform numerous calculations using a number of parameters. Adjustments to these parameters may affect the performance of the computing systems. For example, the adjustments may decrease the likelihood that the computing systems determine the presence of a given object or increase the likelihood that the computing systems do not detect the presence of an object, such as a car, traffic light, or pedestrian.

BRIEF SUMMARY

An apparatus for optimizing object detection performed by an autonomous vehicle is disclosed. In one embodiment, the apparatus includes a memory operative to store a first plurality of images captured by an autonomous vehicle and a second plurality of images, corresponding to the first plurality of images, in which an object label has been applied an object depicted in an image of the second plurality of images. The apparatus may also include a processor in communication with the memory, where the processor operative to receive the first plurality of images from the autonomous vehicle and display a first image from the first plurality of images, wherein the first image comprises an object. The processor may also be operative to receive the object label for the object displayed in the first image from the first plurality of images to obtain a first image from the second plurality of images, compare the received object label with an object label applied by the autonomous vehicle to the object in the first image in the first plurality of images, and determine whether the received object label corresponds to the object label applied by the autonomous vehicle.

In another embodiment of the apparatus, the first plurality of images comprise a first plurality of images captured by a first sensor of a first sensor type and a second plurality of images captured by a second sensor of a second sensor type.

In a further embodiment of the apparatus, wherein the first sensor comprises a camera and the second sensor comprises a laser.

In yet another embodiment of the apparatus, the first plurality of images captured by the first sensor are images captured from a forward perspective of the autonomous vehicle.

In yet a further embodiment of the apparatus, the second plurality of images captured by the second sensor are images captured from a panoramic perspective of the autonomous vehicle.

In another embodiment of the apparatus, the at least one object label comprises a plurality of parameters that define the object label, and the plurality of parameters depend on an image sensor type used to capture the first image from the first plurality of images captured by the autonomous vehicle.

In a further embodiment of the apparatus, the processor is further operative to determine whether the received object label corresponds to the object label applied by the autonomous vehicle by determining whether the object label applied by the autonomous vehicle overlaps any portion of the received object label.

In yet another embodiment of the apparatus, the processor is further operative to determine whether the received object label corresponds to the object label applied by the autonomous vehicle by determining an object identification ratio derived from the received object label and the object label applied by the autonomous vehicle.

In yet a further embodiment of the apparatus, the processor is operative to determine whether the received object label corresponds to the object label applied by the autonomous vehicle based on a first area represented by the intersection of an area of the received object label with an area of the object label applied by the autonomous vehicle, and a second area represented by the union of the area of the received object label with the area of the object label applied by the autonomous vehicle.

In another embodiment of the apparatus, the object label applied by the autonomous vehicle is based on a plurality of object detection parameters, and the processor is further operative to optimize the plurality of object detection parameters when the indication of the correspondence between the received object label and the object label applied by the autonomous vehicle does not exceed a predetermined correspondence threshold.

A method for optimizing object detection performed by an autonomous vehicle is also disclosed. In one embodiment, the method includes storing, in a memory, a first plurality of images captured by an autonomous vehicle and displaying, with a processor in communication with a memory, a first image from the first plurality of images, wherein the first image comprises an object. The method may also include receiving an object label for the object displayed in the first image from the first plurality of images to obtain a first image for a second plurality of images, and comparing the received object label with an object label applied by the autonomous vehicle to the object in the first image in the first plurality of images, and determining whether the received object label corresponds to the object label applied by the autonomous vehicle.

In another embodiment of the method, the first plurality of images comprise a first plurality of images captured by a first sensor of a first sensor type and a second plurality of images captured by a second sensor of a second sensor type.

In a further embodiment of the method, the first sensor comprises a camera and the second sensor comprises a laser.

In yet another embodiment of the method, the first plurality of images captured by the first sensor are images captured from a forward perspective of the autonomous vehicle.

In yet a further embodiment of the method, the second plurality of images captured by the second sensor are images captured from a panoramic perspective of the autonomous vehicle.

In another embodiment of the method, the at least one object label comprises a plurality of parameters that define the object label, and the plurality of parameters depend on an image sensor type used to capture the first image from the first plurality of images captured by the autonomous vehicle.

In a further embodiment of the method, determining whether the received object label corresponds to the object label applied by the autonomous vehicle comprises determining whether the object label applied by the autonomous vehicle overlaps any portion of the received object label.

In yet another embodiment of the method, determining whether the received object label corresponds to the object label applied by the autonomous vehicle comprises determining an object identification ratio derived from the received object label and the object label applied by the autonomous vehicle.

In yet a further embodiment of the method, determining whether the received object label corresponds to the object label applied by the autonomous vehicle is based on a first area represented by the intersection of an area of the received object label with an area of the object label applied by the autonomous vehicle, and a second area represented by the union of the area of the received object label with the area of the object label applied by the autonomous vehicle.

In another embodiment of the method, the object label applied by the autonomous vehicle is based on a plurality of object detection parameters, and the method further comprises optimizing the plurality of object detection parameters when the indication of the correspondence between the received object label and the object label applied by the autonomous vehicle does not exceed a predetermined correspondence threshold.

A further apparatus for optimizing object detection performed by an autonomous vehicle is also disclosed. In one embodiment, the apparatus includes a memory operative to store a plurality of images captured by an autonomous vehicle using object detection parameters, a first plurality of object label parameters determined by the autonomous vehicle, and a second plurality of object label parameters applied by a reviewer having reviewed the plurality of images captured by the autonomous vehicle. The apparatus may also include a processor in communication with the memory, the processor operative to determine whether to optimize the plurality of object detection parameters based on a comparison of the first plurality of object label parameters with the second plurality of object label parameters, and perform an operation on the plurality of object detection parameters based on the comparison of the first plurality of object label parameters with the second plurality of object label parameters.

The operation performed on the plurality of object detection parameters may include identifying a plurality of object detection values, wherein each object detection value corresponds to at least one object detection parameter in the plurality of object detection parameters. For each possible combination of the plurality of object detection values, the operation may include performing an object detection routine on the plurality of images captured by the autonomous vehicle using the plurality of object detection values. The operation may also include selecting the combination of plurality of object detection values that resulted in an optimal object detection routine.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

This disclosure provides for an apparatus and method directed to optimizing one or more object detection parameters used by a computing system on an autonomous vehicle. In particular, this disclosure provides for an apparatus and method of optimizing the one or more object detection parameters by comparing the identification of objects by the computing system in the autonomous vehicle with the identification of objects by one or more reviewers. The reviewers may review the raw images captured by the autonomous vehicle and the reviewers may manually label the objects depicted in the raw images. By "raw" image, it is meant that the image may not have been marked upon or modified by the autonomous vehicle. In other words, a "raw image" may be an image as captured by a sensor without markings that would alter the view depicted therein. As discussed with reference to FIG. 10 below, a reviewer may use the object identification server to create electronic object labels on the raw images captured by the autonomous vehicle. Captured images having been electronically marked with object labels may not be considered raw images.

The manual object labels may then be compared with object labels applied by the computing system of the autonomous vehicle to determine whether the one or more object detection parameters should be optimized. In this manner, the disclosed apparatus and method increases the likelihood that the computing system of the autonomous vehicle recognizes an object depicted in one or more raw images.

Figure 1:
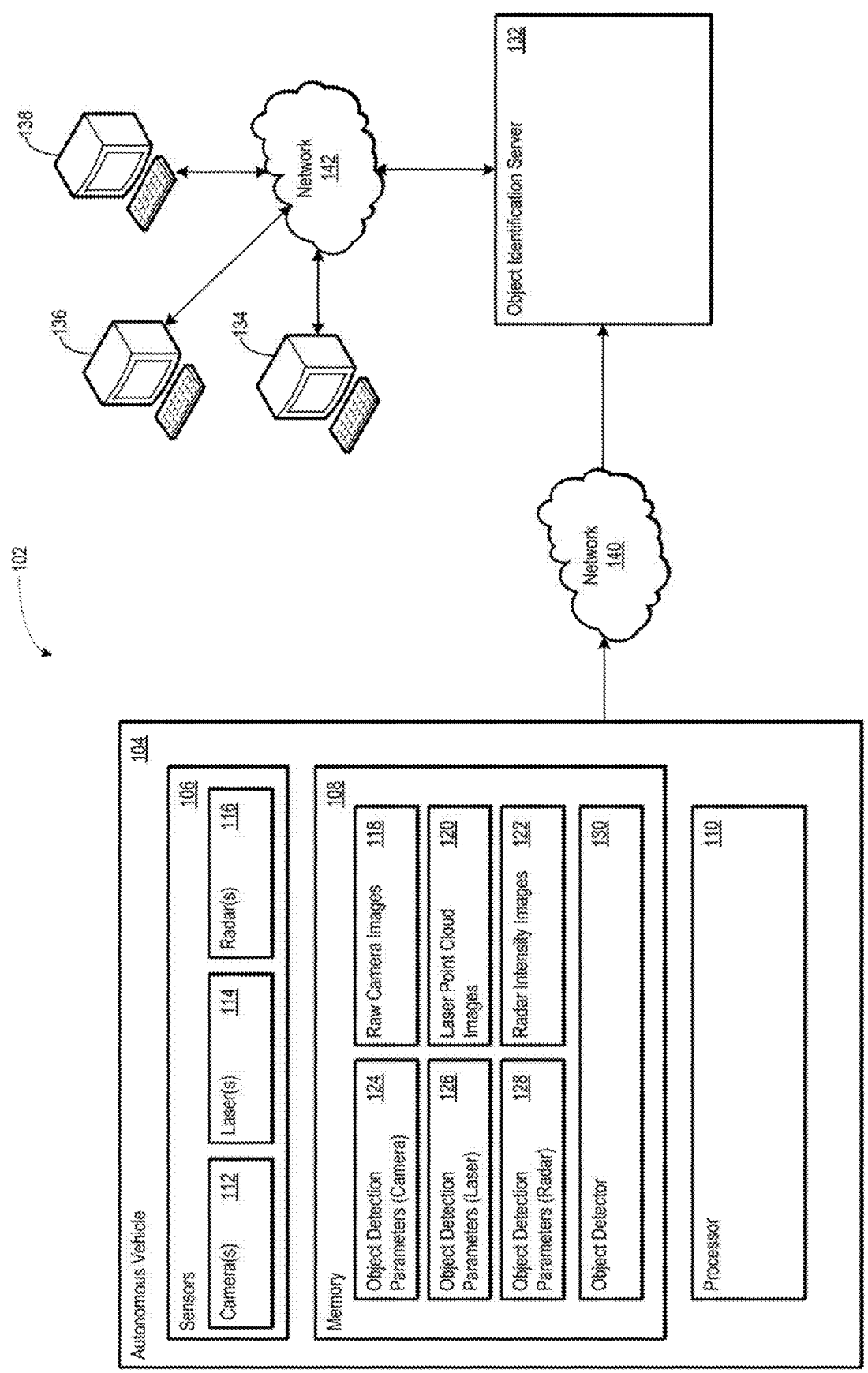
FIG. 1 illustrates an example of an apparatus for optimizing one or more object detection parameters according to aspects of the disclosure.

FIG. 1 illustrates an apparatus 102 for optimizing the one or more object detection parameters. In one embodiment, the apparatus may include an autonomous vehicle 104 configured to communicate with an object identification server 132. The autonomous vehicle 104 may be configured to operate autonomously, e.g., drive without the assistance of a human driver. Moreover, the autonomous vehicle 104 may be configured to detect various objects and determine the types of detected objects while the autonomous vehicle 104 is operating autonomously.

While certain aspects of the disclosure are particularly useful in connection with specific types of vehicles, the autonomous vehicle 104 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

The autonomous vehicle 104 may be equipped with various types of sensors 106 for detecting objects near and/or around with the autonomous vehicle 104. For example, the autonomous vehicle 104 may be equipped with one or more cameras 112 for capturing images of objects in front of and/or behind the autonomous vehicle 104. As another example, the autonomous vehicle 104 may be equipped with one or more lasers 114 for detecting objects near and/or around the autonomous vehicle 104. Moreover, the autonomous vehicle 104 may be equipped with one or more radars 116 for detecting objects near and/or around the autonomous vehicle 104.

While FIG. 1 illustrates that the autonomous vehicle 104 may be equipped with one or more cameras 112, one or more lasers 114, and one or more radars 116, the autonomous vehicle 104 may be equipped with alternative arrangements of sensors. For example, the autonomous vehicle 104 may be equipped with sonar technology, infrared technology, accelerometers, gyroscopes, magnetometers, or any other type of sensor for detecting objects near and/or around the autonomous vehicle 104.

The autonomous vehicle 104 may also include a memory 108 and a processor 110 operative to capture raw images using the sensors 106. While shown as a single block, the memory 108 and the processor 110 may be distributed across many different types of computer-readable media and/or processors. The memory 108 may include random access memory ("RAM"), read-only memory ("ROM"), hard disks, floppy disks, CD-ROMs, flash memory or other types of computer memory.

Although FIG. 1 functionally illustrates the processor 110, the memory 108, and other elements of the autonomous vehicle 104 as being within the same block, it will be understood by those of ordinary skill in the art that the processor 110, the memory 108, and the sensors 106 may actually comprise multiple processors, computers, or memories that may or may not be stored within the same physical housing.

The memory 108 may be operative to store one or more images 118-122 captured by one or more of the sensors 106. The captured raw images may include raw camera images 118 captured using the one or more cameras 112, laser point cloud images 120 captured using the one or more lasers 114, or radar intensity images 122 captured using one or more radars. Depending on the type of sensors used by the autonomous vehicle 104, the memory 108 may store other types of images as well.

The images 118-122 may be formatted in any computer-readable format. For example, the images 118-122 data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics.

The raw camera images 116 may include one, two, or three-dimensional images having a predetermined number of megapixels. The raw camera images 116 may further be in color, black and white, or in any other format. The one or more cameras 112 may be operative to capture the one or more raw camera image(s) 118 at predetermined time intervals, such as every one millisecond, every second, every minute, or at any other interval of time. Other measurements of capturing images may also be possible, such as 30 frames per second ("fps") 60 fps, or any other measurement.

The laser point cloud images 120 may include one or more images comprised of laser points representing a predetermined view angle near and/or around the autonomous vehicle 104. For example, the laser point cloud images 120 may include one or more laser point cloud images representing a 360° view around the autonomous vehicle 104. The laser point cloud images 120 may include a predetermined number of laser points, such as 50,000 laser points, 80,000 laser points, 100,00 laser points, or any other number of laser points. As with the raw camera images 118, the autonomous vehicle 104 may be configured to capture the one or more laser point cloud images 120 at predetermined time intervals, such as 10 fps, 30 fps, every millisecond, every second, or at any other interval of time.

The radar intensity images 122 may include one or more images captured using a radar technology. As with the laser point cloud images 120 or the raw camera images 116, the radar intensity images 122 may be captured at predetermined time intervals.

Although the sensors 106 may be configured to capture images at predetermined time intervals, the predetermined time intervals may vary from sensor to sensor. Thus, the one or more camera(s) 112 may be configured to capture one or more raw images 118 at a time interval different than the one or more laser(s) 114, which may also capture one or more laser point cloud images 120 at a time interval different than the radar(s) 116. Hence, it is possible that the autonomous vehicle 104 is capturing an image, whether using the camera(s) 112, the laser(s) 114, or the radar(s) 116 at any given time.

The autonomous vehicle 104 may also include a processor 110 operative to control the sensors 106 to capture the one or more images 118-122. The processor 110 may be any conventional processor, such as commercially available central processing units ("CPUs"). As one example, the processor 110 may be implemented with a microprocessor, a microcontroller, a digital signal processor ("DSP"), an application specific integrated circuit (ASIC), discrete analog or digital circuitry, or a combination of other types of circuits or logic.

The memory 108 may also be operative to store an object detector 130. The object detector 130 may be any configuration of software and/or hardware configured to detect an object in an image 118-122 captured by one or more of the sensors 106. As an image is captured by one or more of the sensors 106, the image may be communicated to the object detector 130, which may analyze the image to determine whether there is an object present in the image. The object in the captured image may be any type of object, such as a vehicle, pedestrian, a road sign, a traffic light, a traffic cone, or any other type of object.

To determine whether an object is present in the image undergoing processing, the object detector 130 may leverage one or more image parameters 124-128. The image parameters 124-128 may instruct the object detector 130 when an arrangement of pixels, laser points, intensity maps, etc., should be considered an object. The image parameters 124-128 may also instruct the object detector 130 as how to classify the object.

Each of the sensor types may be associated with a corresponding set of image parameters. Thus, the one or more camera(s) 112 may be associated with camera parameters 124, the one or more laser(s) 114 may be associated with laser parameters 126, and the one or more radar(s) 116 may be associated with radar parameters 128. Examples of camera parameters 124 may include the minimal brightness of a pedestrian, the minimum pixel size of a car object, the minimum width of a car object, and other such parameters. Examples of laser parameters 126 may include the height of a pedestrian, the length of a car object, an obstacle detection threshold, and other such parameters. Examples of radar parameters 128 may include minimum distance to an object, a delay threshold for detecting an object, the height of a pedestrian, and other such parameters.

As discussed with reference to FIGS. 12-18, when the object detector 130 detects an object in an image, the object detector 130 may define an object label for the detected object. The object label may be defined by a bounding box encompassing the object. In alternative embodiments, the object label may be defined by a bounding oval or other bounding shape.

The object label may have one or more object label parameters that define the shape of the object label. Moreover, the object label parameters may vary depending on the sensor type of the sensor that captured the image. Assuming that the shape of the object label is a bounding box, and that the sensor that captured the image is a one or more of the cameras 112, the object label parameters may include a height parameter that defines the height of the bounding box (in pixels), a width parameter that defines the width of the bounding box (in pixels), a first pixel coordinate that defines the latitudinal placement of the bounding box (e.g., an X-coordinate), and a second pixel coordinate that defines the longitudinal placement of the bounding box (e.g., a Y-coordinate). Where the sensor that captured the image is one or more of the lasers 126, the object label parameters may also include a third pixel coordinate that defines the physical height of the object or a particular laser point depicted in the captured image (e.g., a Z-coordinate). This third pixel coordinate should not be confused with the height parameter of the object label, because this third pixel coordinate may indicate the elevation of the detected object or of a given laser point (e.g., 3 meters above sea level, 2 meters above sea level, etc.) This third pixel coordinate may further indicate the height of the detected object or laser point relative to the autonomous vehicle 104.

In addition, the object label applied by the object detector 130 may be associated with an image frame number that identifies the image in which the detected object may be located. As a moving object may be located in a number of images, such as a moving vehicle captured by one or more of the cameras 112, the moving object may appear in different locations in different images. Hence, the moving object may have a number of different object labels associated with it, and each of the object labels may be associated with a corresponding image number to identify the location of the moving object across multiple images.

The autonomous vehicle 104 may also be in communication with an object identification server 132. The object identification server 132 may be operative to verify the objects detected by the autonomous vehicle 104 using the object detector 130. Moreover, the object identification server 132 may facilitate the optimization of one or more of the parameters 124-128 used by the object detector 130 to detect objects in the captured images 118-122. In one embodiment, the autonomous vehicle 104 may communicate the object labels, and their corresponding object label parameters, to the object identification server 132 for verifying that the object labels were correctly, or substantially correctly, applied to objects appearing in one or more of the captured images 118-122. The implementation of the object identification server 132 is discussed with reference to FIG. 12.

The object identification server 132 may also be in communication with one or more client devices 134-138 via a network 142. The networks 140-142 may be implemented as any combination of networks. Moreover, the networks 140-142 may be the same network. The networks 140-142 may also be various types of networks. As examples, the networks 140-142 may be a Wide Area Network ("WAN"), such as the Internet; a Local Area Network ("LAN"); a Personal Area Network ("PAN"), or a combination of WANs, LANs, and PANs. Moreover, the networks 122-128 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of protocol.

The client devices 134-138 may be operated by a reviewer that may review one or more of the object labels applied by the object detector 130. The client devices 134-138 in communication with the object identification server 132 may be any type of client device. As examples, and without limitation, the client devices 134-138 may include one or more desktop computers and one or more mobile devices. Examples of a mobile device include a laptop, a Personal Digital Assistant ("PDA"), a tablet computer, or other such mobile device. Accordingly, a review may communicate and interact with the object identification server 132 regardless of whether the client devices 134-138 are desktop computers, mobile devices (e.g., laptops, smartphones, PDAs, etc.), or any other such client device.

The one or more reviewers may also review one or more of the captured images 118-122 and may manually apply object labels to objects appearing in the one or more captured images 118-122. As discussed below with reference to FIG. 12, the object identification server 132 may compare the manually applied object labels with the object labels applied by the object detector 130 of the autonomous vehicle 104 to optimize one or more of the object detection parameters 124-128.

In addition, while the object identification server 132 is shown separately from the client devices 134-138, a reviewer may use the object identification server 132 without a client device. In other words, the object identification server 132 may be a desktop computer usable by the reviewer without an intermediary client device.

Figure 2:
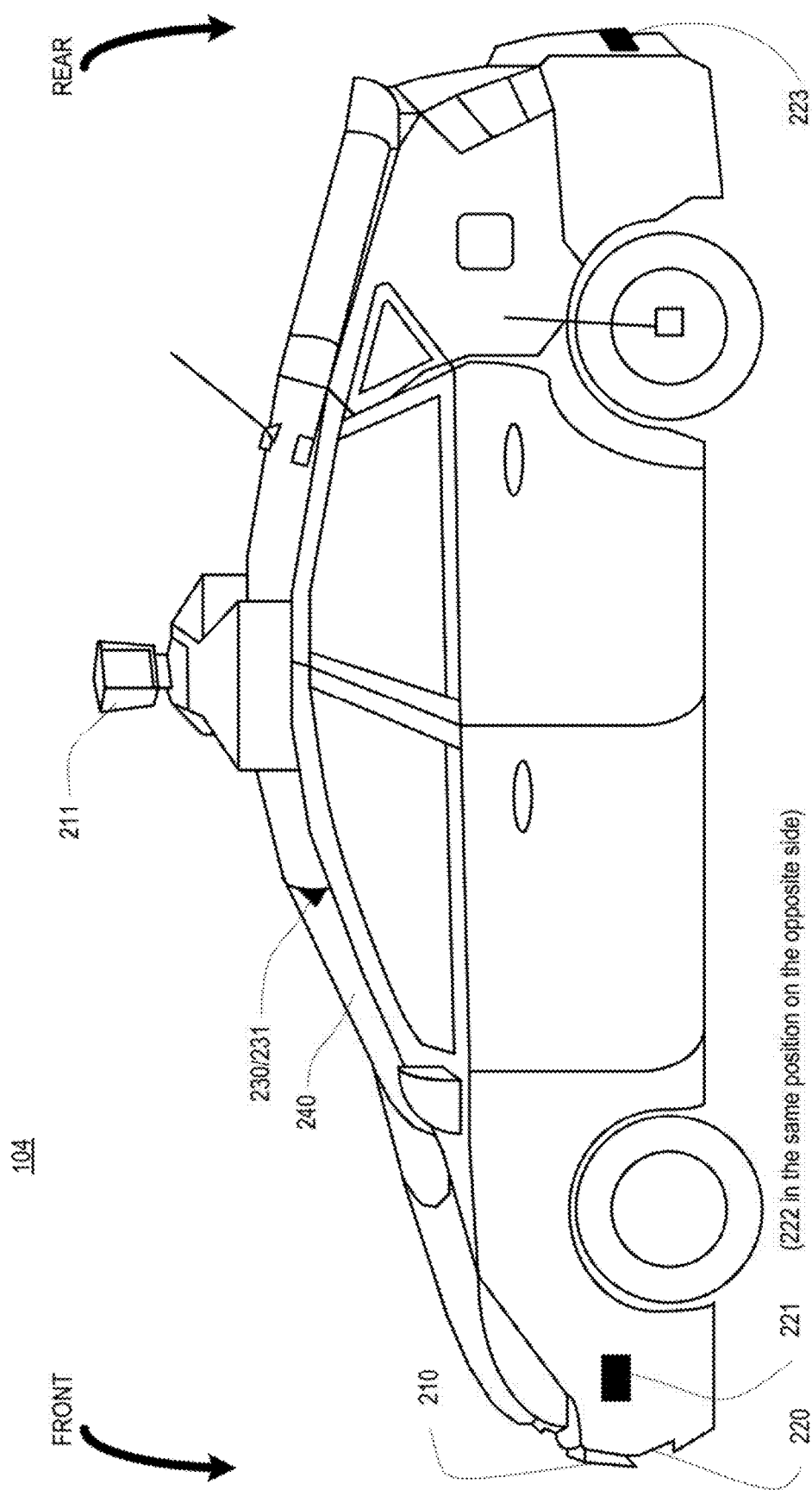
FIG. 2 illustrates an example of the placement of one or more sensors on an autonomous vehicle according to aspects of the disclosure.

FIG. 2 illustrates one example of the autonomous vehicle 104 and the placement of the one more sensors 106. The autonomous vehicle 104 may include lasers 210 and 211, for example, mounted on the front and top of the autonomous vehicle 104, respectively. The laser 210 may have a range of approximately 150 meters, a thirty degree vertical field of view, and approximately a thirty degree horizontal field of view. The laser 211 may have a range of approximately 50-80 meters, a thirty degree vertical field of view, and a 360 degree horizontal field of view. The lasers 210-211 may provide the autonomous vehicle 104 with range and intensity information that the processor 110 may use to identify the location and distance of various objects. In one aspect, the lasers 210-211 may measure the distance between the vehicle and the object surfaces facing the vehicle by spinning on their axes and changing their pitch.

The autonomous vehicle 104 may also include various radar detection units, such as those used for adaptive cruise control systems. The radar detection units may be located on the front and back of the car as well as on either side of the front bumper. As shown in the example of FIG. 2, the autonomous vehicle 104 includes radar detection units 220-223 located on the side (only one side being shown), front and rear of the vehicle. Each of these radar detection units 220-223 may have a range of approximately 200 meters for an approximately 18 degree field of view as well as a range of approximately 60 meters for an approximately 56 degree field of view.

In another example, a variety of cameras may be mounted on the autonomous vehicle 104. The cameras may be mounted at predetermined distances so that the parallax from the images of two or more cameras may be used to compute the distance to various objects. As shown in FIG. 2, the autonomous vehicle 104 may include two cameras 230-231 mounted under a windshield 340 near the rear view mirror (not shown).

The camera 230 may include a range of approximately 200 meters and an approximately 30 degree horizontal field of view, while the camera 231 may include a range of approximately 100 meters and an approximately 60 degree horizontal field of view.

Figure 3A:
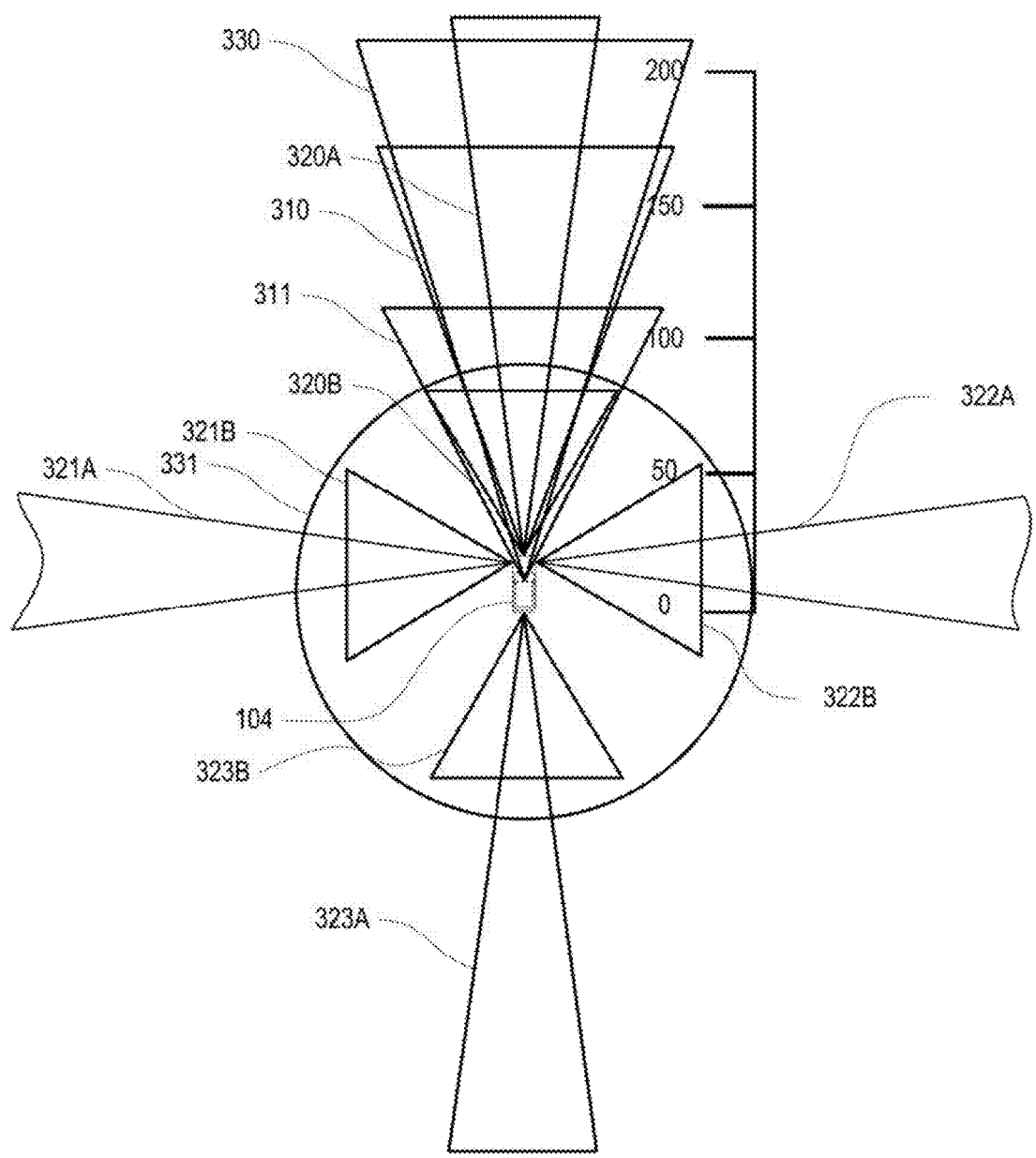
FIGS. 3A-3D illustrates various views of the approximate sensor fields of the various sensors on the autonomous vehicle according to aspects of the disclosure.

Each sensor may be associated with a particular sensor field in which the sensor may be used to detect objects. FIG. 3A is a top-down view of the approximate sensor fields of the various sensors. FIG. 3B depicts the approximate sensor fields 310 and 311 for the lasers 210 and 211, respectively based on the fields of view for these sensors. For example, the sensor field 310 includes an approximately 30 degree horizontal field of view for approximately 150 meters, and the sensor field 311 includes a 360 degree horizontal field of view for approximately 80 meters.

FIG. 4C depicts the approximate sensor fields 320A-323B and for radar detection units 220-223, respectively, based on the fields of view for these sensors. For example, the radar detection unit 220 includes sensor fields 320A and 320B. The sensor field 320A includes an approximately 18 degree horizontal field of view for approximately 200 meters, and the sensor field 320B includes an approximately 56 degree horizontal field of view for approximately 80 meters. Similarly, the radar detection units 221-223 include the sensor fields 321A-323A and 321B-323B. The sensor fields 321A-323A include an approximately 18 degree horizontal field of view for approximately 200 meters, and the sensor fields 321B-323B include an approximately 56 degree horizontal field of view for approximately 80 meters. The sensor fields 321A and 322A extend passed the edge of FIGS. 3A and 3C.

Figure 3D:
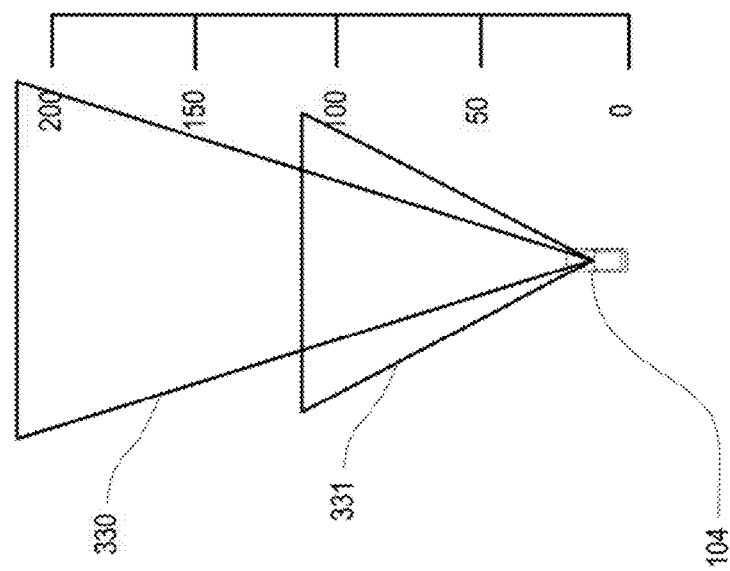
Figure 3B:
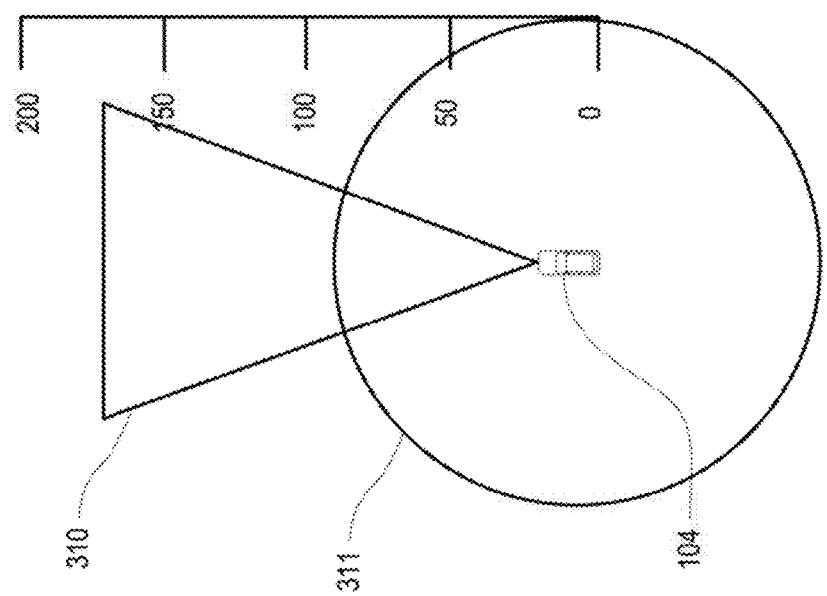
Figure 3C:
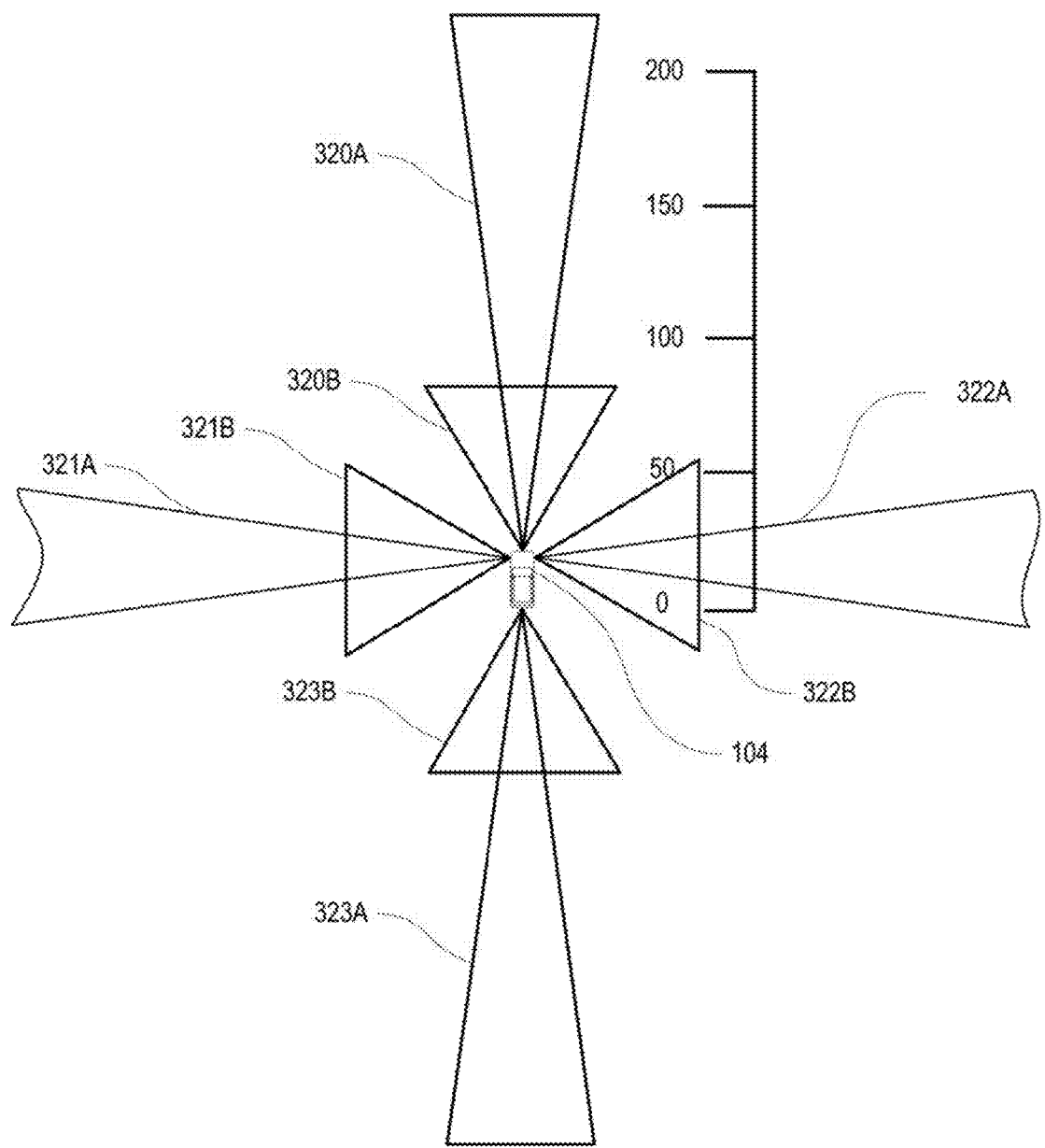

FIG. 3D depicts the approximate sensor fields 330-331 of cameras 230-231, respectively, based on the fields of view for these sensors. For example, the sensor field 330 of the camera 230 includes a field of view of approximately 30 degrees for approximately 200 meters, and sensor field 331 of the camera 231 includes a field of view of approximately 60 degrees for approximately 100 meters.

In general, an autonomous vehicle 104 may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters. Hence, the autonomous vehicle 104 may be configured with any arrangement of sensors, and each of these sensors may capture one or more raw images for use by the object detector 130 to detect the various objects near and around the autonomous vehicle 104.

Figure 4:
FIG. 4 is a raw camera image captured by a camera mounted on the autonomous vehicle according to aspects of the disclosure.
Figure 5:
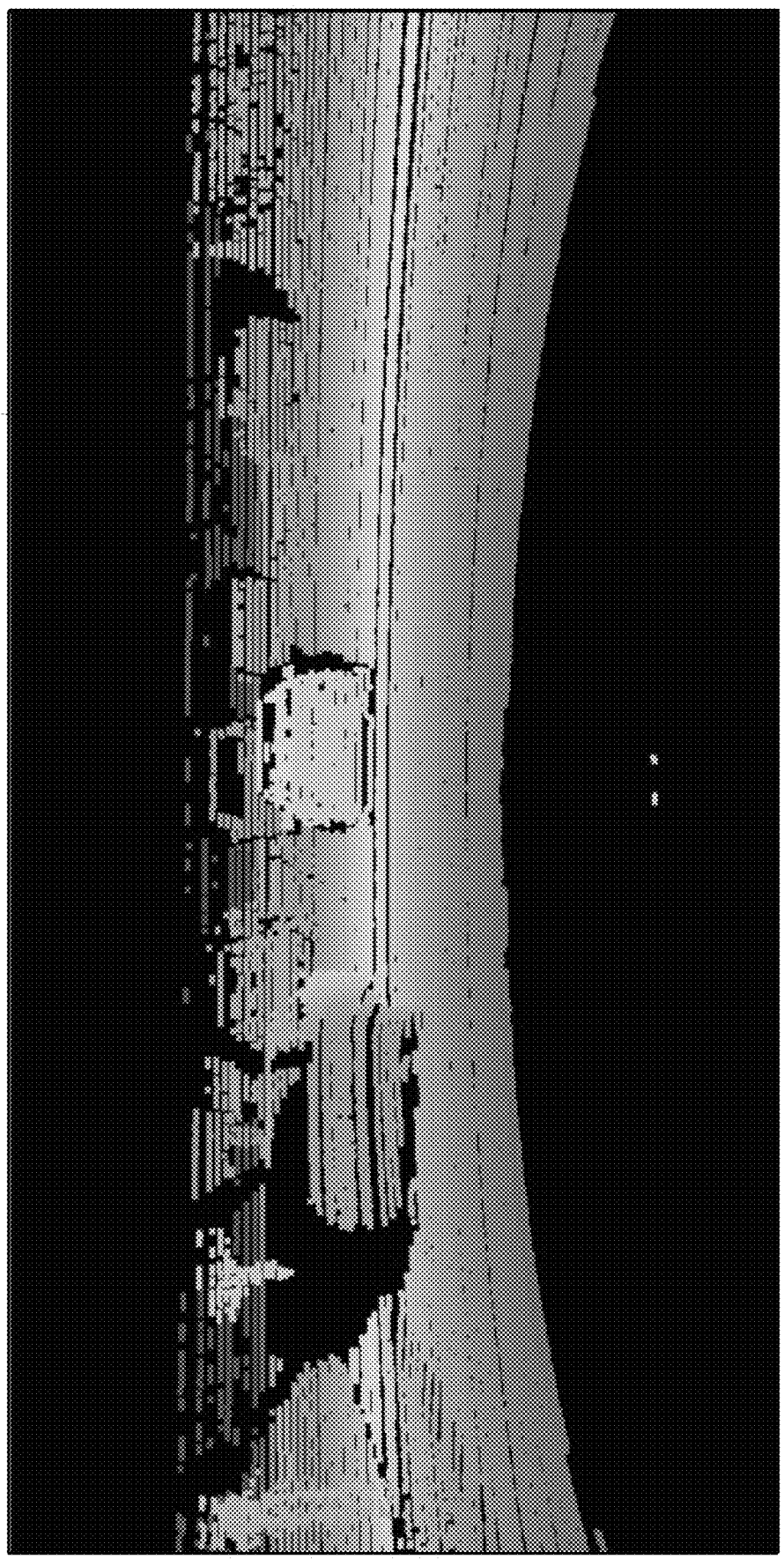
FIG. 5 is a laser point cloud image of the view shown in FIG. 4 according to aspects of the disclosure.
Figure 6:
FIG. 6 is another raw camera image captured by a camera mounted on the autonomous vehicle according to aspects of the disclosure.
Figure 7:
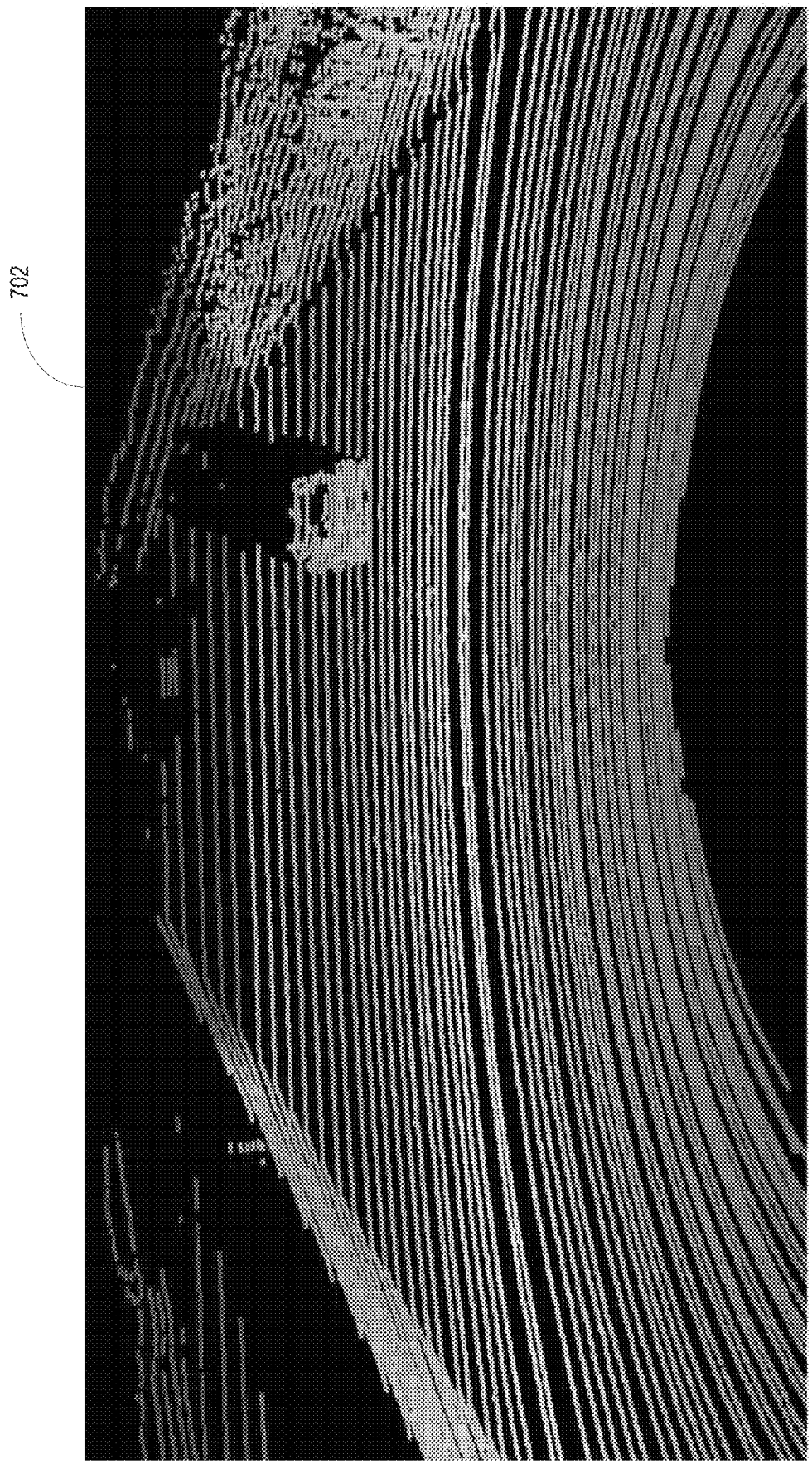
FIG. 7 is a laser point cloud image of the view shown in FIG. 6 according to aspects of the disclosure.
Figure 8:
FIG. 8 is yet a further raw camera image captured by a camera mounted on the autonomous vehicle according to aspects of the disclosure.
Figure 9:
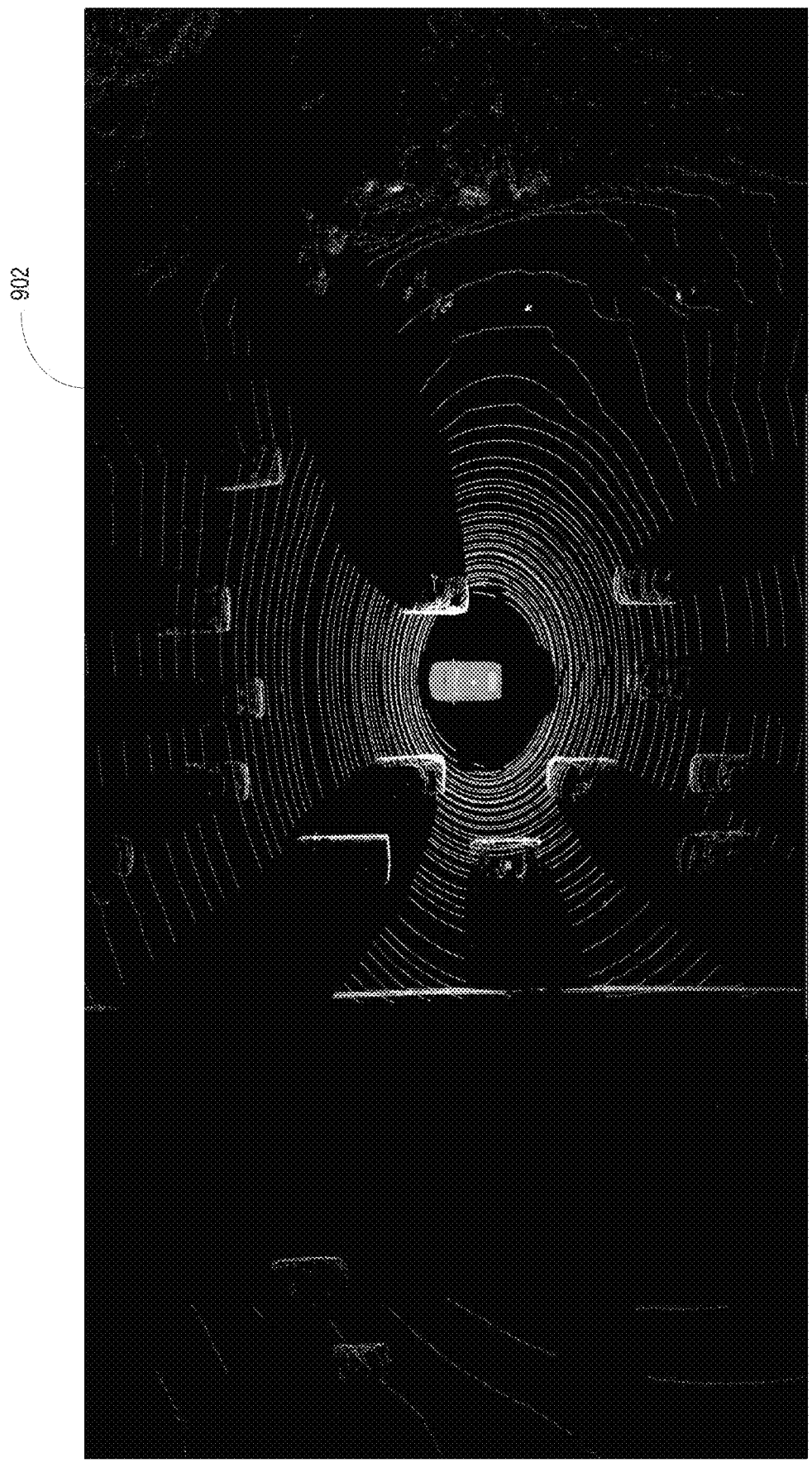
FIG. 9 is a laser point cloud image of the view shown in FIG. 8 according to aspects of the disclosure.

FIGS. 4-9 are examples of various images that may be captured by one or more sensors 106 mounted on the autonomous vehicle 104. FIG. 4 is a first example of a raw camera image 402 captured by one or more of the cameras 112. FIG. 5 is a first example of a laser point cloud image 502 of the view shown in the first raw camera image 402. FIG. 6 is a second example of a raw camera image 602 captured by one or more of the cameras 112. Similarly, FIG. 7 is an example of a laser point cloud image 702 of the view shown in the raw camera image 602. FIG. 8 is yet another example of a raw camera image 802, and FIG. 9 is an example of a laser point cloud image 902 of the view shown in the raw camera image 802.

As shown in the examples of FIGS. 5, 7, and 9, a laser point cloud image may substantially or approximately correspond to a raw camera image captured by a camera. Moreover, FIGS. 5, 7, and 9 demonstrate that the autonomous vehicle 104 may be configured to capture more than one type of laser point cloud image. The autonomous vehicle 104 may be similarly configured to capture other types of perspectives using other types of sensors as well (e.g., a panoramic image from a camera).

As the autonomous vehicle 104 is capturing the one or more images 118-122, the object detector 130 may be analyzing the images to determine whether there are objects present in the captured images 118-122. As mentioned previously, the object detector 130 may leverage one or more object detection parameters 124-128 in determining whether an object is present in the image. To verify or improve the accuracy of detecting objects by the object detector 130, the autonomous vehicle 104 may also communicate one or more of the captured images 118-122 to the object identification server 132. Communicating the captured images 118-122 to the object identification server 132 may occur at any time, such as while the autonomous vehicle 104 is capturing the one or images 124-128, after the autonomous vehicle 104 has captured the one or more images 124-128, or at any other time.

Figure 10:
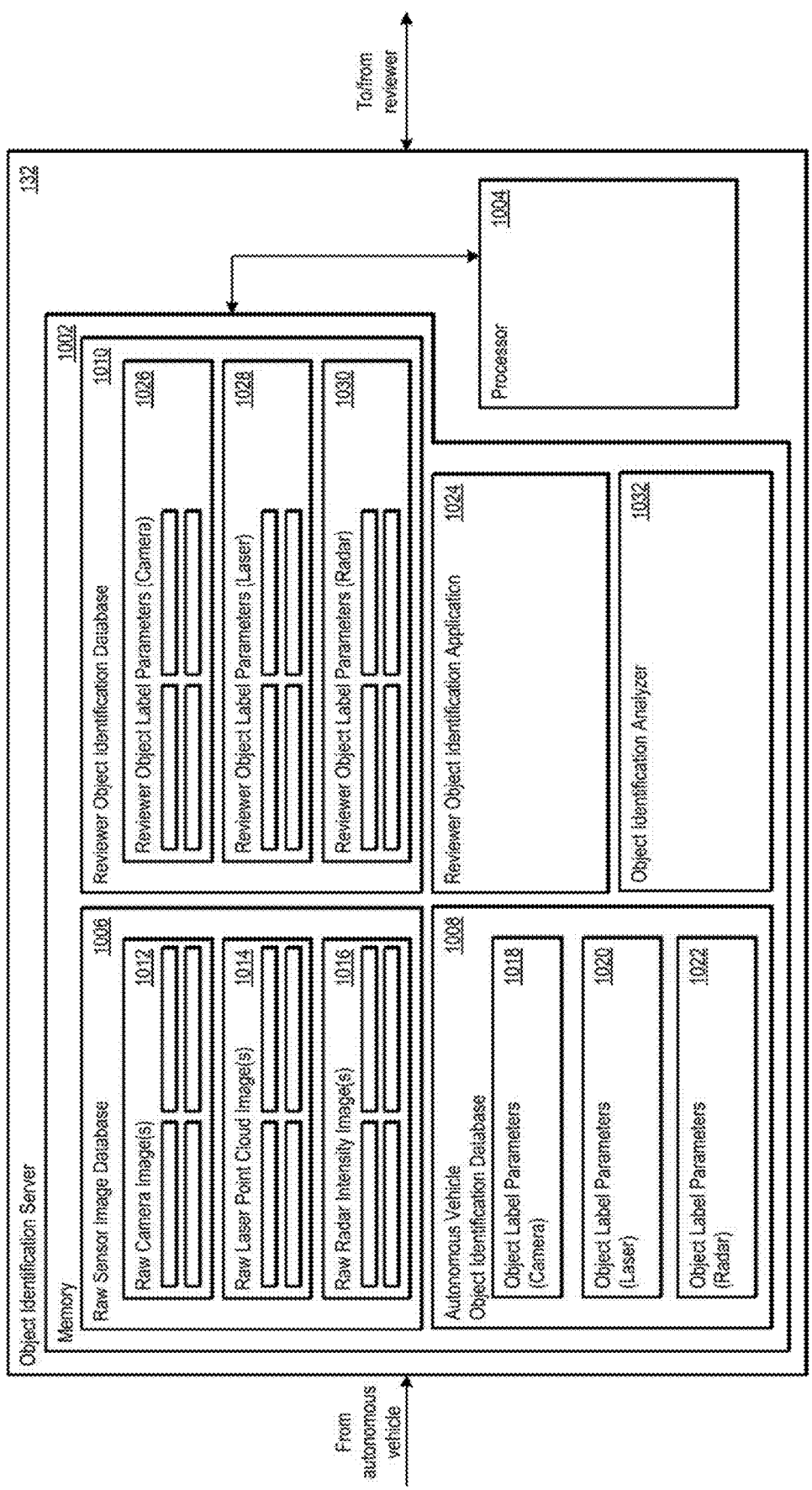
FIG. 10 illustrates one example of an object identification server according to aspects of the disclosure.

FIG. 10 illustrates one example of the object identification server 132 according to aspects of the disclosure. The object identification server 132 may include a memory 1002 and a processor 1004. The memory 1002 may include random access memory ("RAM"), read-only memory ("ROM"), hard disks, floppy disks, CD-ROMs, flash memory or other types of computer memory. In addition, the memory 1002 may be distributed across many different types of computer-readable media.

The processor 1004 may be a microprocessor, a microcontroller, a DSP, an ASIC, discrete analog or digital circuitry, or a combination of other types of circuits or logic. In addition, the processor 1004 may be distributed across many different types of processors.

Interfaces between and within the object identification server 132 may be implemented using one or more interfaces, such as Web Services, SOAP, or Enterprise Service Bus interfaces. Other examples of interfaces include message passing, such as publish/subscribe messaging, shared memory, and remote procedure calls.

The memory 1002 may be operative to store one or more databases. For example, the memory 1002 may store a raw sensor image database 1006, an autonomous vehicle object identification database 1008, and a reviewer object identification database 1010. One or more of the databases 1006-1010 may be implemented in any combination of components. For instance, although the databases 1006-1010 are not limited to any single implementation, one or more of the databases 1006-1010 may be stored in computer registers, as relational databases, flat files, or any other type of database.

Although shown as a single block, the object identification server 132 may be implemented in a single system or partitioned across multiple systems. In addition, one or more of the components of the object detection server 132 may be implemented in a combination of software and hardware. In addition, any one of the components of the object identification server 132 may be implemented in a computer programming language, such as C#, C++, JAVA or any other computer programming language. Similarly, any one of these components may be implemented in a computer scripting language, such as JavaScript, PHP, ASP, or any other computer scripting language. Furthermore, any one of these components may be implemented using a combination of computer programming languages and computer scripting languages.

The raw sensor image database 1006 may store one or more of the images communicated by the autonomous vehicle 104 to the object identification server 132. Accordingly, the raw sensor image database 1006 may include images 1012 captured by one or more of the cameras 112, images 1014 captured by one or more of the lasers 114, and images 1016 captured by one or more of the radars 116. The images 1012-1016 may be formatted in any computer-readable format. For example, the images 1012-1016 data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. Moreover, the images 1012-1016 stored in the raw sensor image database 1006 may correspond to, or be copies of, the images 118-122 stored in the memory 108 of the autonomous vehicle 104.

The autonomous vehicle object identification database 1008 may include the object label parameters determined by the object detector 130 for the objects appearing in the one or more images 1012-1016. Thus, in one embodiment, for each object label applied to each object detected by the object detector 130, the object identification server 132 may store the set of parameters that define each of the object labels. As a set of object label parameters define an object label, the autonomous vehicle object identification database 1008 may be considered to effectively store object labels.

In addition, the autonomous vehicle object identification database 1008 may store object labels for each type of image. Thus, the autonomous vehicle object identification database 1008 may store object labels 1018 for the camera images 1012, object labels 1020 for the laser point cloud images 1014, and object labels 1022 for the radar images 1016.

The memory 1002 may also store a reviewer object identification application 1024 executable by the processor 1004. A reviewer may use the reviewer object identification application 1024 to identify objects (e.g., apply object labels to objects) appearing in the images 1012-1016 stored in the raw sensor image database 1006. A reviewer may include a human reviewer or a computerized reviewer operative to communicate with the reviewer object identification application 1024. While the reviewer object identification application 1024 is shown as residing in the memory 1010 of the object identification server 132, the object identification application 1024 may alternatively reside in the memory of a client device in communication with the object identification server 132.

To apply object labels to object, the reviewer object identification application 1024 may display each image to the reviewer. The reviewer may then draw an object label, such as a bounding box or other shape, around an object that the autonomous vehicle 104 should recognize or detect. The reviewer may also provide identification information for the identified object, such as an object name (e.g., "vehicle," "bicycle," "pedestrian," etc.). Alternatively, the object name may be selectable by the reviewer, such as being selectable as part of a drop-down menu or other graphical menu. The reviewer object identification application 1024 may then store the object label parameters that define the object label in the reviewer object identification database 1010. As discussed previously with regard to the object detector 130, the object label parameters may include a width parameter, a height parameter, an X-parameter, a Y-parameter, an image number parameter, and, where the image undergoing review is a laser point cloud image, a Z-parameter.

In addition, the reviewer object identification application 1024 may employ interpolation techniques to reduce the strain on the reviewer of identifying objects. For example, the reviewer may identify (e.g., by electronically drawing a bounding box around an object using a mouse or other input device) an object appearing in a first image, and the reviewer may identify the object appearing in a last image. The reviewer object identification application 1024 may then interpolate the object label parameters for the object appearing in images between the first image and the last image. Thus, in instances where an object, such as a moving vehicle traveling alongside the autonomous vehicle 104, appears in hundreds or thousands of images, the reviewer object identification application 1024 may reduce the time and effort required by the reviewer to identify the object in each image.

The reviewer object identification database 1010 may store the object label parameters determined by the reviewer object identification application 1024. The object label parameters may include object label parameters 1026 for raw camera images, object label parameters 1028 for laser point cloud images, and object label parameters 1030 for radar intensity images. The reviewer object identification database 1010 may store object label parameters for other types of images and/or sensors as well, such as object label parameters for sonar images, infrared images, or any other type of image.

FIGS. 11-16 are examples of object labels electronically applied to the images captured by the sensors of the autonomous vehicle 104. The object labels shown in FIGS. 11-16 have a rectangular shape, but any other shape is also possible. The object labels shown in FIGS. 11-16 are examples of object labels that may be applied by the object detector 130 of the autonomous vehicle 104 or may have been applied by a reviewer using the reviewer object identification application 1024.

Moreover, the object detector 130 may, as opposed to electronically drawing the object labels on the images, store the object label parameters that define the object label. In contrast, for expediency, a reviewer may draw an object label around an object using an input device in conjunction with the reviewer object identification application 1024, and the reviewer object identification application 1024 may determine the object label parameters based on the dimensions of the drawn object label and other aspects of the given image, such as the X-coordinate pixel and the Y-coordinate pixel derived from the given image's resolution.

Figure 11:
FIG. 11 is a raw camera image that includes applied object labels according to aspects of the disclosure.
Figure 12:
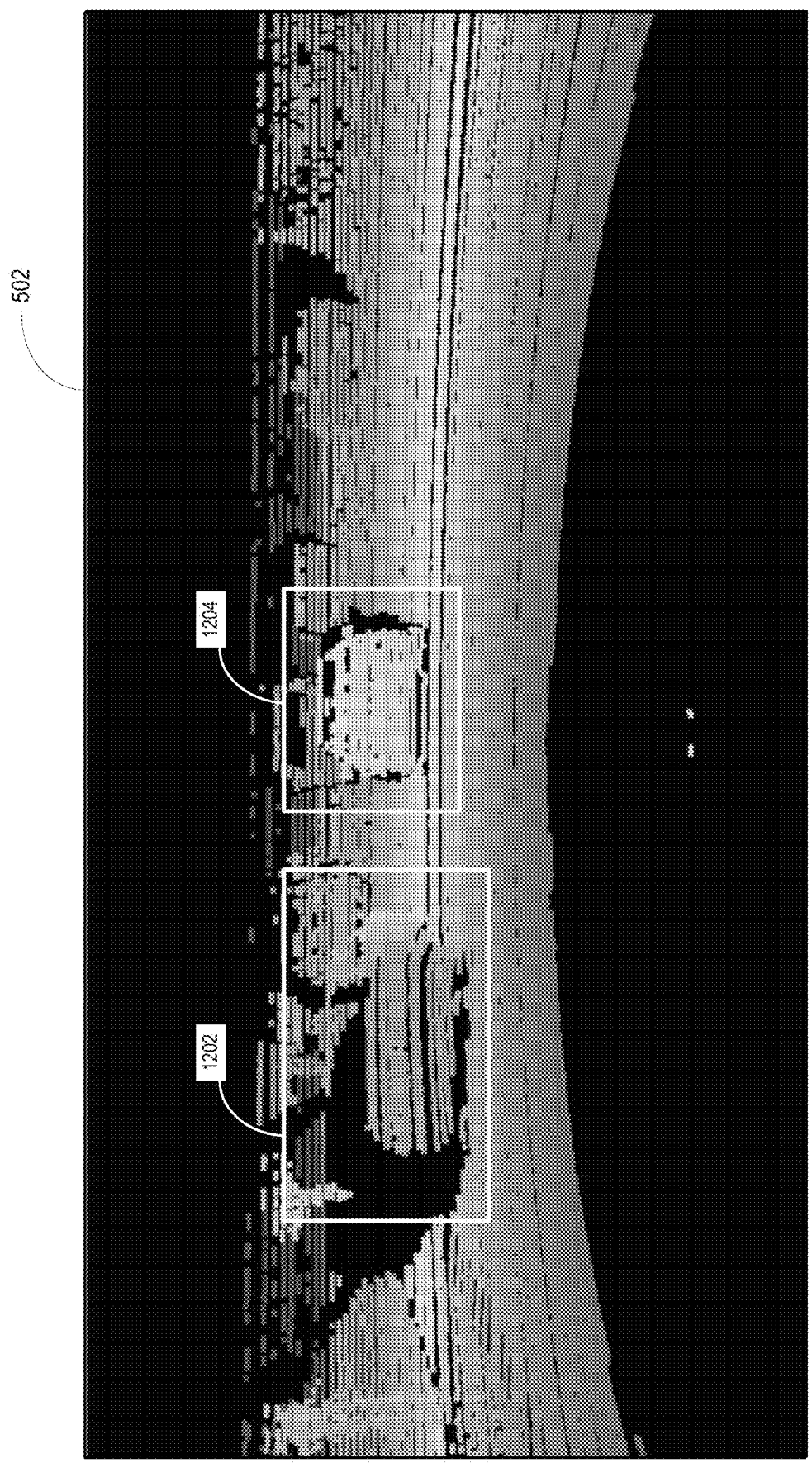
FIG. 12 is a laser point cloud image having applied object labels of the view shown in FIG. 11 according to aspects of the disclosure.
Figure 13:
FIG. 13 is another raw camera image that includes an applied object label according to aspects of the disclosure.
Figure 14:
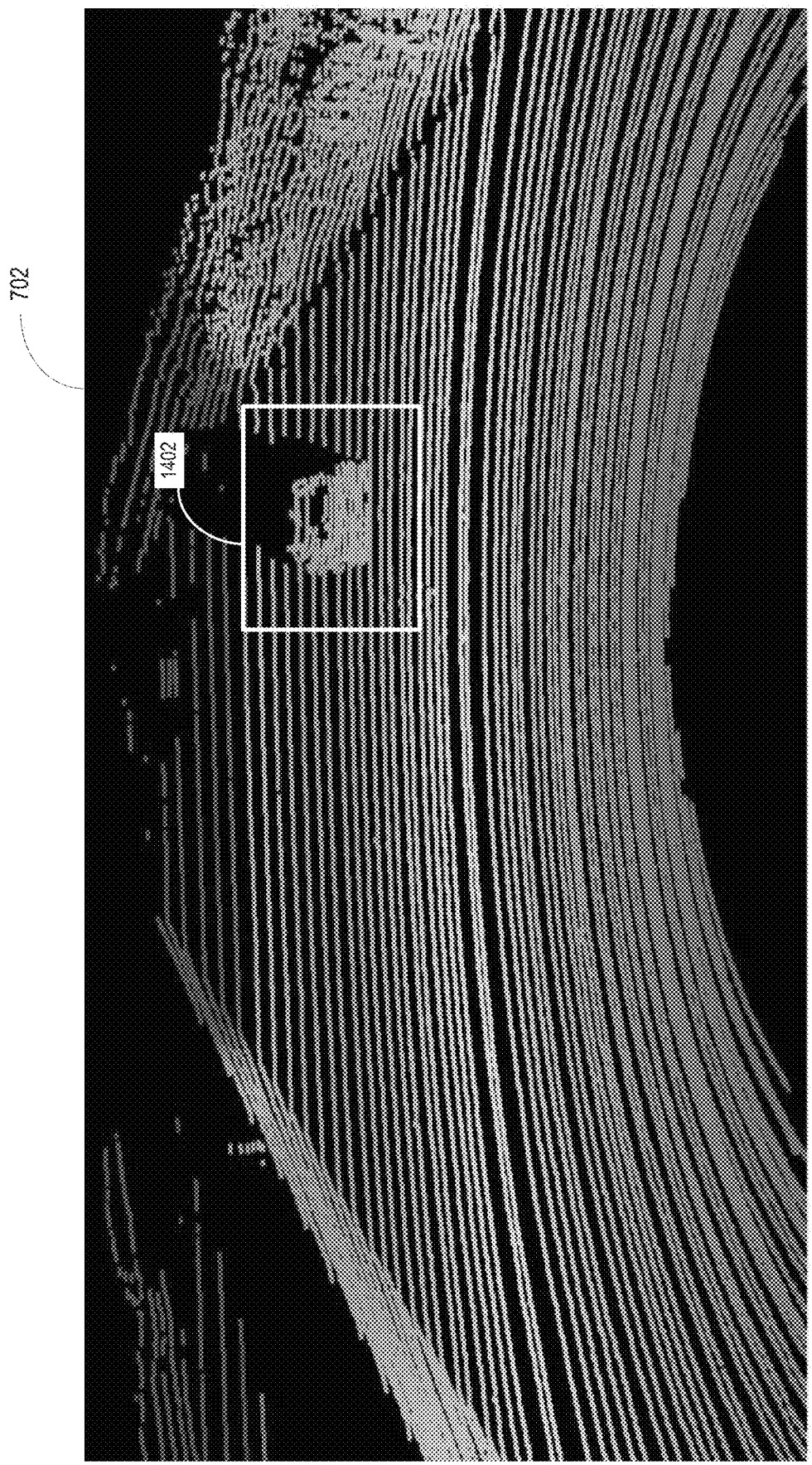
FIG. 14 is a laser point cloud image having an applied object label of the view shown in FIG. 13 according to aspects of the disclosure.
Figure 15:
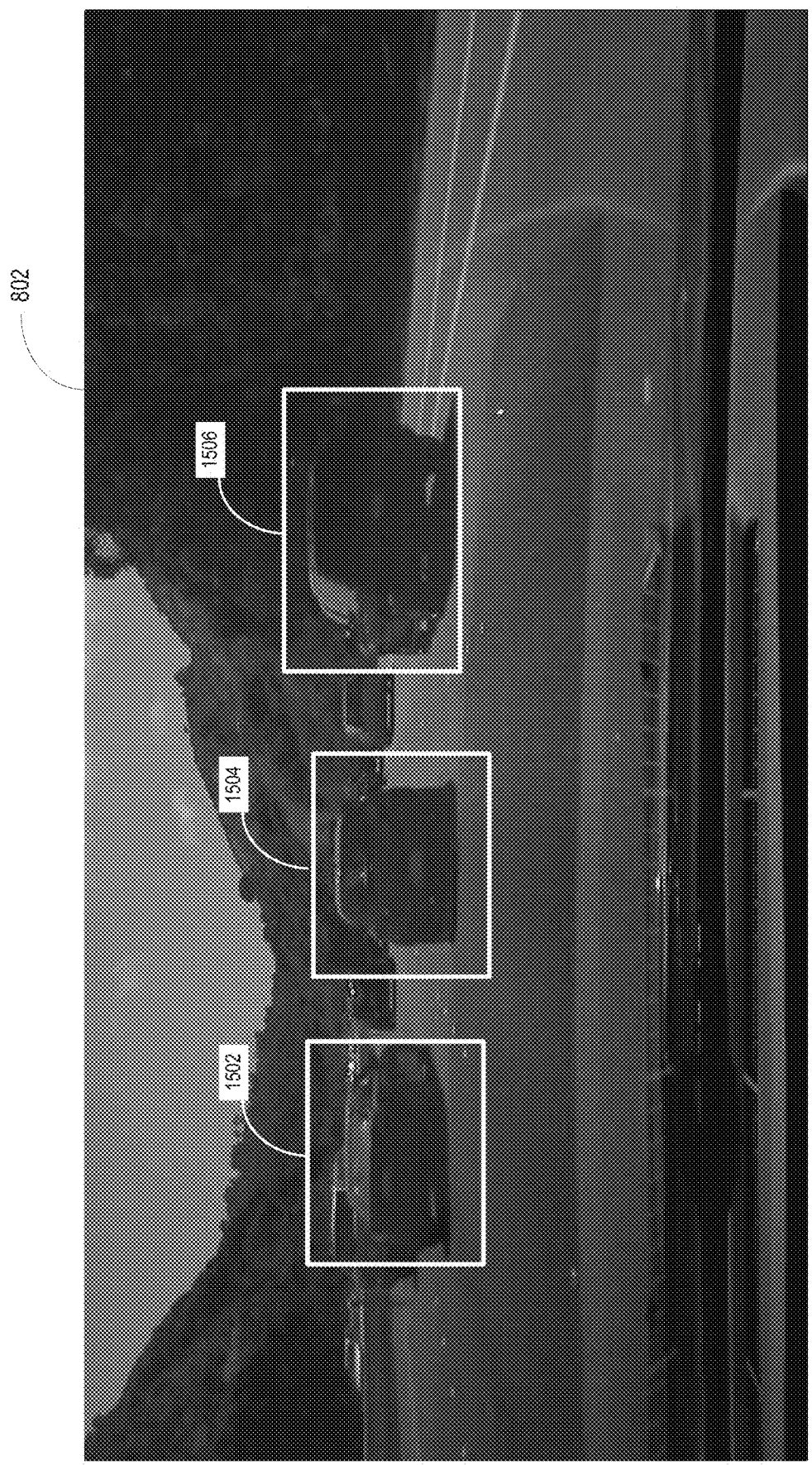
FIG. 15 is yet another raw camera image that includes applied object labels according to aspects of the disclosure.
Figure 16:
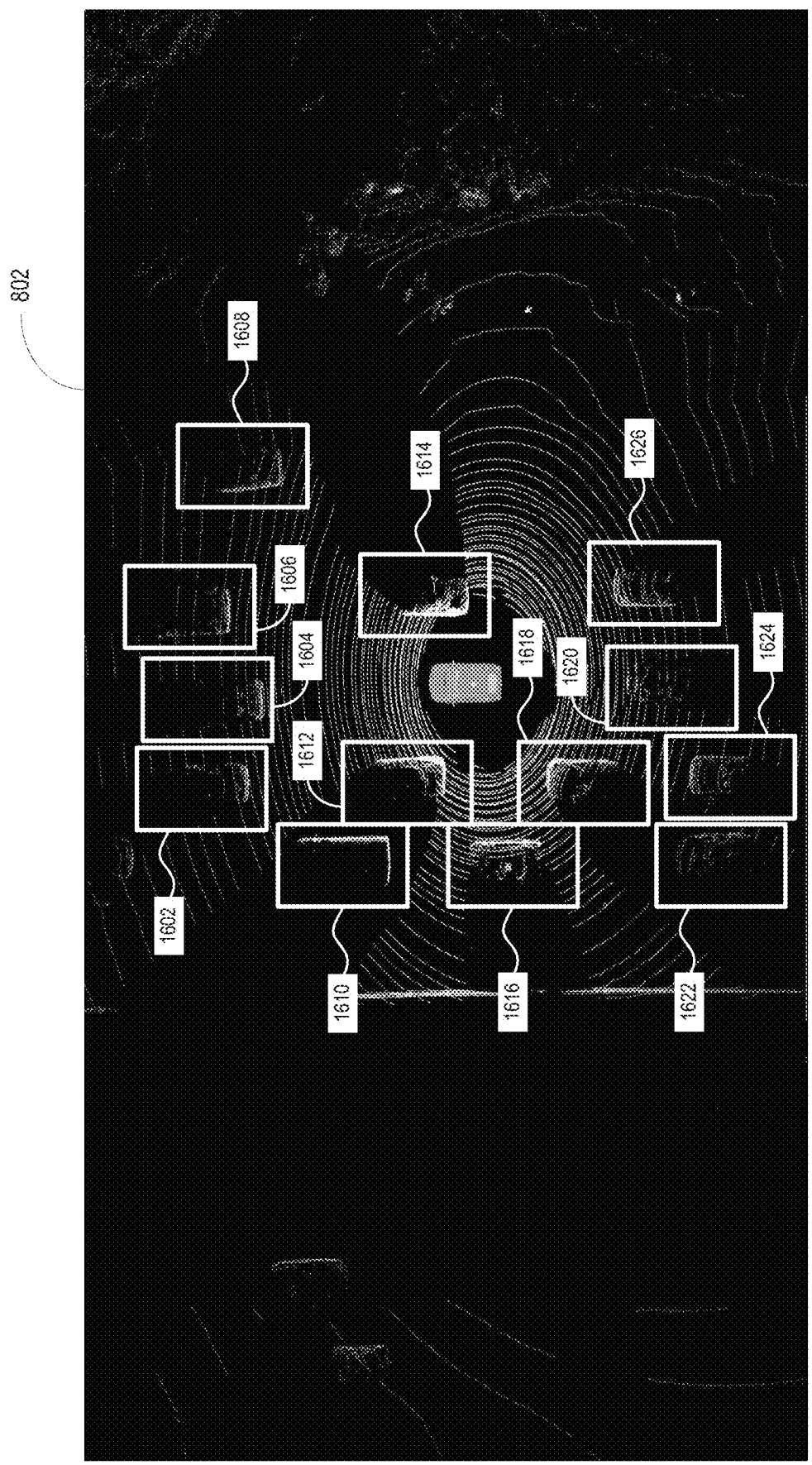
FIG. 16 is a laser point cloud image having applied object labels of the view shown in FIG. 15 according to aspects of the disclosure.

FIG. 11 shows the raw camera image 402 of FIG. 4 with three rectangular object labels 1102-1106 applied to three different objects. FIG. 12 shows the laser point cloud image 502 of FIG. 5 with two rectangular object labels 1202-1204 applied to two different objects. FIG. 13 shows the raw camera image 602 of FIG. 6 with one object label 1302 applied to a single object. FIG. 14 shows the laser point cloud image 702 of FIG. 7 with one object label 1402 applied to a single object. FIG. 15 shows the raw camera image 802 with three rectangular object labels 1502-1506 applied to three different objects. FIG. 16 shows the laser point cloud image 802 of FIG. 8 with thirteen object labels 1602-1626 applied to thirteen different objects.

With the object label parameters 1026-1030 from the reviewers and the object label parameters 1018-1022 from the autonomous vehicle 104, the object identification server 132 may then proceed to optimizing the object detection parameters 124-128 used by the object detector 130 of the autonomous vehicle 104. To this end, the object identification server 132 may include an object identification analyzer 1032 executable by the processor 1004 for performing the optimization.

In optimizing the object detection parameters 124-128, the object identification analyzer 1032 may first determine whether an optimization operation should be performed. To make this determination, the object identification analyzer 1032 may compare the object labels applied by the autonomous vehicle 104 with the object labels applied by the one or more reviewers. Comparing the object labels of the autonomous vehicle 104 with the object labels applied by the one or more reviewers may include comparing the object label parameters 1018-1022 received from the autonomous vehicle 104 with the corresponding type of object label parameters 1026-1030 derived from the object labels applied by the one or more reviewers.

In comparing the object label parameters 1018-1022 with the object label parameters 1026-1030, the object identification analyzer 1032 may compare corresponding types of object labels. That is, the object identification analyzer 1032 may compare the object label parameters 1018 with the object label parameters 1026 for the raw camera images, the object label parameters 1020 with the object label parameters 1028 for the laser point cloud images, and the object label parameters 1022 with the object label parameters 1030 of the radar intensity images. Alternatively, the object identification analyzer 1032 may compare object label parameters of different types.

In one embodiment, the object identification analyzer 1032 may compare, for each image, the number of object labels applied by a reviewer with the number of object labels applied by the autonomous vehicle 104. In this embodiment, the object identification analyzer 1032 may determine whether the autonomous vehicle 104 detected the same number of objects as identified by a reviewer. A predetermined "missed object" threshold may be established for the object identification analyzer 1032 that establishes the number of permissible objects, as an absolute number or percentage, that the autonomous vehicle 104 is allowed to not detect. In this embodiment, should the autonomous vehicle 104 not detect a given percentage or number of objects (e.g., the autonomous vehicle 104 did not detect 3% of the objects identified by a reviewer), the object identification analyzer 1032 may display to the reviewer the percentage of objects not detected by the autonomous vehicle 104. The object identification analyzer 1032 may then recommend optimization of the object detection parameters 124-128. The object identification analyzer 1032 may also display the results of this analysis to the reviewer. Alternatively, the object identification analyzer 1032 may automatically proceed to the optimization of the object detection parameters 124-128.

In another embodiment of comparing the autonomous vehicle object label parameters 1018-1022 with the reviewer object label parameters 1026-1030, the object identification analyzer 1032 may determine whether any of the object labels applied by the autonomous vehicle overlap with any of the object labels applied by the reviewer. In this embodiment, the object identification analyzer 1032 may determine, not only whether the autonomous vehicle 104 detected the same number of objects as a reviewer, but whether the autonomous vehicle 104 detected the same objects. This comparison may also indicate how accurately the autonomous vehicle 104 detected an object.

To determine the accuracy of the object labels applied by the autonomous vehicle 104, the object identification analyzer 1032 may determine an object label ratio defined as:

$$\frac{\text{intersection (object label}_{autonomous\ vehicle},\ \text{object label}_{reviewer})}{\text{union (object label}_{autonomous\ vehicle},\ \text{object label}_{reviewer})}$$

where "intersection (object label$_{autonomous\ vehicle}$, object label$_{reviewer}$)" is the area of the intersection of the object label applied by the autonomous vehicle 104 and the object label applied by the reviewer, and "union (object label$_{autonomous\ vehicle}$, object label$_{reviewer}$)" is the area of the union of the object label applied by the autonomous vehicle 104 with the object label applied by the reviewer. Where there is a direct correlation (e.g., a direct overlap) between the object label applied by the autonomous vehicle 104 and the object label applied by the reviewer, the object label ratio may have a value of 0.5. With an imperfect correlation, the object label ratio may have a value less than 0.5. Each object label in each image may be associated with an object label ratio. The object identification analyzer 1032 may also assign an object label ratio to objects that the autonomous vehicle 104 did not detect or an object label ratio to objects that the autonomous vehicle 104 incorrectly detected (e.g., the autonomous vehicle 104 detected an object that a reviewer did not identify).

Using the object label ratios, where each object label in each image for a given set of images has an object label ratio, the object identification analyzer 1032 may determine the mean object label ratio value. Thus, the set of raw camera images 1012 may have a mean object label ratio value, the set of raw laser point cloud images 1014 may have a mean object label ratio value, and the set of raw radar intensity images 1016 may have a mean object label ratio value. Similar to the predetermined "missed object" threshold, the object identification analyzer 1032 may be configured with an object label ratio threshold (e.g., 0.35%) for each image type, and the mean object label ratio for a given set of images may be compared with the object label ratio threshold.

Since the different types of sensors may detect objects differently, each image type may be associated with a different value for the object label ratio threshold. For example, the set of raw camera images 1012 may be associated with an object label ratio threshold of 0.4%, the set of raw laser point cloud images 1014 may be associated with an object label ratio threshold of 0.35%, and the set of raw radar intensity images 1016 may be associated with an object label ratio of 0.37%. Of course, the set of raw images 1012-1016 may also be associated with the same value for the object label ratio threshold.

In this embodiment, where the mean object label ratio for a given set of images does not meet (or exceeds) the object label ratio threshold associated with the set of images, the object identification analyzer 1032 may display to the reviewer a level of inaccuracy in detecting objects by the autonomous vehicle 104. The object identification analyzer 1032 may then recommend optimization of the object detection parameters 124-128. The object identification analyzer 1032 may also display the results of this analysis to the reviewer. Alternatively, the object identification analyzer 1032 may automatically proceed to the optimization of the object detection parameters 124-128.

In yet a third embodiment, the object identification analyzer 1032 may compare a computed speed of an object labeled by the autonomous vehicle 104 with a computed speed of an object labeled by a reviewer. The object identification analyzer 1032 may compute the speed of an object by determining the distance an object travels in a series of one or more images (e.g., since the object identification analyzer 1032 may be configured with or derive the rate at which the images were captured). The object identification analyzer 1032 may then determine the differences in speed between objects detected by the autonomous vehicle 104 and the corresponding objects identified by the reviewer. The object identification analyzer 1032 may then recommend optimization of the object detection parameters 124-128 based on the number and value of the determined speed differences. The object identification analyzer 1032 may also display the results of this analysis to the reviewer. Alternatively, the object identification analyzer 1032 may automatically proceed to the optimization of the object detection parameters 124-128.

The object identification server 132 may use one or more optimization techniques to optimize the various object detection parameters 124-128. In one embodiment, the object identification server 132 performs the detection of objects with the instructions used by the object detector 130 using the possible combinations of values of the object detection parameters 124-128. For example, suppose that the object detection parameters 124 for raw camera images include ten parameters, and each parameter may have one of ten values. In this example, the object identification server 132 may perform the object detection analysis $10^{10}$ times, and for each performance of the object detection analysis, the object identification server 132 may store a separate set of object labels (e.g., object label parameters). Thus, in this example, the object detection analysis may result in $10^{10}$ different sets of object label parameters. The object identification server 132 may perform this object detection analysis for each sensor type, for each sensor, or for combinations thereof.

Having performed the object detection analysis with the possible combination of values of the object detection parameters, the object identification server 132 may then invoke the object identification analyzer 1032 for each set of object label parameters. Thus, using the example above, the object identification analyzer 1032 may perform $10^{10}$ analyses with one or more of the comparison embodiments previously discussed (e.g., the "missed object" analysis, the object label ratio analysis, and/or the object speed difference analysis).

The object identification server 132 may then select or display the combination of values for the object detection parameters that resulted in the most favorable outcome for each analysis. For example, for the "missed object" analysis, the object identification server 132 may display the set of values for the object detection parameters that resulted in the least number of objects that were not detected or incorrectly detected. As another example, for the object label ratio analysis, the object identification server 132 may display the set of values for the object detection parameters that resulted in the mean object label ratio closest to (or farthest from) the mean object label ratio threshold. Although the number of analyses may exponentially increase with each object detection parameter, the commercial availability of high-performance processors has made this optimization technique a practical reality. The autonomous vehicle 104 may then be configured with the optimized values for the selected set of object detection parameters.

Figure 17:
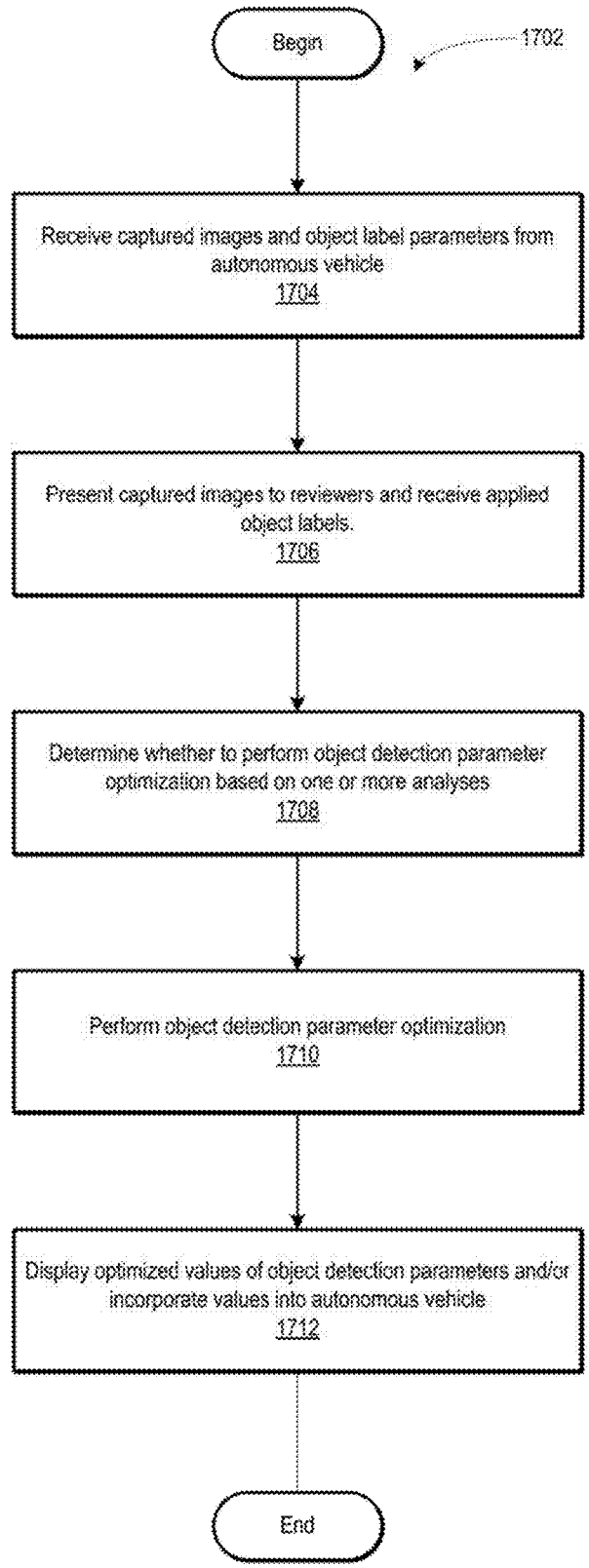
FIG. 17 illustrates one example of logic flow for optimizing object detection parameters according to aspects of the disclosure.

FIG. 17 illustrates one example of logic flow 1702 for optimizing one or more sets of object detection parameters 124-128 of the autonomous vehicle 104. As previously discussed, the autonomous vehicle 104 may capture one or more images 118-122 using one or more sensors 112-116. The autonomous vehicle 104 may then detect objects in the one or more captured images 118-122. In detecting these objects, the autonomous vehicle 104 may determine object label parameters for each of the detected objects in each of the images. The object label parameters 124-128 and the captured images 118-122 may then be communicated to the object identification server 132 (Block 1704).

The object identification server 132 may then display each of the captured images to a reviewer for identifying objects. In response, the object identification server 132 may receive object labels applied to the objects identified by the reviewers (Block 1706). As with the object label parameters determined by the autonomous vehicle 104, the object labels applied by the one or more reviewers may be stored as object label parameters. In certain cases, the object identification server 132 may apply the object labels to objects (e.g., during interpolation when a reviewer has identified an object in a first image and the object in a last image).

The object identification server 132 may then determine whether to perform optimization on one or more sets of the object detection parameters 124-128 of the autonomous vehicle 104 (Block 1708). The object identification 132 may make this determination using one or more comparison analyses previously discussed (e.g., the "missed object" analysis, the mean object label ratio analysis, and/or the object speed difference analysis).

Depending on the results of the one or more analyses, the object identification server 132 may recommend optimization of one or more sets of object detection parameters 124-128. Alternatively, the object identification server 132 may automatically perform the optimization. Where the object identifications server 132 recommends the optimization of one or more sets of object detection parameters 124-128, and receives instructions to perform the optimization, the object identification server 132 may then perform the optimization of the one or more object detection parameters as previously discussed (Block 1710). The results of the optimization may then be displayed or incorporated into the autonomous vehicle 104 (Block 1712).

In this manner, the object identification server 132 facilitates the optimization of various object detection parameters used by the autonomous vehicle 104. To increase the accuracy of the objects detected by the autonomous vehicle 104, the object identification server 132 may leverage input provided by reviewers. The input may be the identification of objects in the raw images captured by the autonomous vehicle 104. Since the sensors on the autonomous vehicle 104 may be different sensor types, the object identification server 132 may leverage different comparison schemes in comparing the object labels of the reviewers with the object labels of the autonomous vehicle. The results of the comparison inform the object identification server 132 whether to recommend optimizing the object detection parameters. Moreover, leveraging various comparison schemes increases the likelihood that the recommendation by the object identification server 132 is a correct and valid recommendation. When performed, the optimization of the object detection parameters by the object identification server increases the likelihood that the autonomous vehicle will more accurately detect an object in a captured image. Increases in the accuracy of detecting objects yields such benefits as a safer driving experience, increased response times, increased predicted behavior responses, and other such benefits.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A server comprising:
one or more processors configured to:
receive, from an autonomous vehicle remotely located from the server, one or more images and a first set of object labels applied to objects in the one or more images identified at the autonomous vehicle;
compare the first set of object labels to a second set of object labels applied to objects in the one or more images identified by a review; and
when a result of the comparison indicates that there is at least a threshold difference between the first set of object labels and the second set of object labels, generate a recommendation of optimization of object detection parameters for the autonomous vehicle.

2. The server of claim 1, wherein the second set of object labels includes at least one object label associated with a speed of an object identified by the reviewer.

3. The server of claim 1, wherein the second set of object labels includes at least one object label identifying a type of an object identified by the reviewer.

4. The server of claim 3, wherein the type of the object is a vehicle or a bicycle.

5. The server of claim 3, wherein the type of the object is a pedestrian.

6. The server of claim 1, wherein the one or more processors are further configured to perform a missed object analysis to determine whether the autonomous vehicle detected a same number of objects as the reviewer based on the comparison of the first set of object labels to the second set of object labels.

7. The server of claim 1, wherein the one or more processors are further configured to indicate a percentage of objects not detected by the autonomous vehicle.

8. The server of claim 1, wherein each object label of the first set of object labels has one or more object label parameters that define a shape of the object label.

9. The server of claim 1, wherein each object in the one or more images is electronically marked with an object label.

10. The server of claim 1, wherein the object detection parameters include at least one of a width parameter, a height parameter, an X-parameter, a Y-parameter, an image number parameter, and a Z-parameter.

11. The server of claim 1, wherein each object label is defined by object label parameters including at least one of object label parameters for raw camera images, object label parameters for laser point cloud images, or object label parameters for radar intensity images.

12. The server of claim 1, wherein each object label is defined by object label parameters including at least one of object label parameters for sonar images or object label parameters for infrared images.

13. The server of claim 1, wherein the one or more processors are further configured to determine whether an optimization operation should be performed.

14. A method comprising:
   receiving, by one or more processors of a server from an autonomous vehicle remotely located from the server, one or more images and a first set of object labels applied to objects in the one or more images identified at the autonomous vehicle;
   comparing, by the one or more processors, the first set of object labels to a second set of object labels applied to objects in the one or more images identified by a reviewer; and
   when a result of the comparison indicates that there is at least a threshold difference between the first set of object labels and the second set of object labels, generating, by the one or more processors, a recommendation of optimization of object detection parameters for the autonomous vehicle.

15. The method of claim 14, wherein the second set of object labels includes at least one label indicating a speed of an object identified by the reviewer.

16. The method of claim 14, wherein the second set of object labels includes at least one object label identifying a type of an object identified by the reviewer.

17. The method of claim 16, wherein the type of the object is a vehicle, a bicycle, or a pedestrian.

18. The method of claim 14, wherein the comparison indicates whether there are any object labels missing from the second set of object labels.

19. The method of claim 14, wherein the comparison indicates how accurately the autonomous vehicle detects an object.

20. The server of claim 1, wherein the reviewer is a computerized reviewer.

* * * * *

UNITED STATES PATENT AND TRADEMARK OFFICE
CERTIFICATE OF CORRECTION

PATENT NO. : 12,228,928 B1
APPLICATION NO. : 18/220628
DATED : February 18, 2025
INVENTOR(S) : Jiajun Zhu et al.

Page 1 of 1

It is certified that error appears in the above-identified patent and that said Letters Patent is hereby corrected as shown below:

In the Claims

Claim 1, Column 18, Line 25:
Now reads: "identified by a review" should read -- identified by a reviewer --

Signed and Sealed this
First Day of April, 2025

Coke Morgan Stewart
*Acting Director of the United States Patent and Trademark Office*